(12) United States Patent
Maeda

(10) Patent No.: US 6,959,231 B2
(45) Date of Patent: *Oct. 25, 2005

(54) ROBOT SYSTEM

(75) Inventor: Katsuhiro Maeda, Tokyo (JP)

(73) Assignee: Kabushiki Kaisha Toshiba, Tokyo (JP)

(*) Notice: Subject to any disclaimer, the term of this patent is extended or adjusted under 35 U.S.C. 154(b) by 22 days.

This patent is subject to a terminal disclaimer.

(21) Appl. No.: 10/691,642

(22) Filed: Oct. 24, 2003

(65) Prior Publication Data

US 2004/0089090 A1 May 13, 2004

Related U.S. Application Data

(62) Division of application No. 10/096,727, filed on Mar. 14, 2002, now Pat. No. 6,732,015.

(51) Int. Cl.[7] .............................................. G06F 19/00
(52) U.S. Cl. ..................... 700/245; 700/260; 901/22; 901/37; 901/48; 901/54; 901/8; 74/490.01; 244/259; 294/119.3; 623/26; 446/456; 446/457; 446/460
(58) Field of Search ................................. 700/245, 260; 901/22, 37, 48, 64, 8; 74/490.01; 244/159; 294/119.3; 623/26; 446/443, 456–457, 460

(56) References Cited

U.S. PATENT DOCUMENTS

| | | |
|---|---|---|
| 5,021,064 A | 6/1991 | Caines |
| 5,245,885 A | 9/1993 | Robertson |
| 5,351,602 A | 10/1994 | Monroe |
| 5,871,386 A | 2/1999 | Bart et al. |
| 6,066,026 A | 5/2000 | Bart et al. |
| 6,439,508 B1 | 8/2002 | Taylor |
| 6,450,104 B1 | 9/2002 | Grant et al. |
| 6,732,015 B2 * | 5/2004 | Maeda ...................... 700/245 |

OTHER PUBLICATIONS

Masayuki Inaba, et al., "Development of a Remote–Brained Robot with Two Legs and Two Arms", Proceedings of the 11th Annual Conference of the Robotics Society of Japan, Nov. 1993, pp. 623–624.

Mills, Hybrid actuation of robotic manipulators: An integral manifold control approach, 1990, IEEE, pp. 817–823.

Mills, Hybrid actuation for robot manipulators: Design, control and performance, 1990, IEEE, pp. 1872–1878.

* cited by examiner

*Primary Examiner*—Thomas G. Black
*Assistant Examiner*—McDieunel Marc
(74) *Attorney, Agent, or Firm*—Oblon, Spivak, McClelland, Maier & Neustadt, P.C.

(57) ABSTRACT

A robot system includes a plurality of segments 3, joints 4 for linking the segments together, drive units 5 for actuating the joints, and a controller 8 for controlling the drive units. Further, the robot system has bladders 2 filled with a fluid being of lower specific gravity than the outside environment. A center of buoyancy differs from a center of gravity, and the robot system has a specific gravity of greater than 1 relative the outside environment.

26 Claims, 27 Drawing Sheets

TURNING OVER

RESTRATION FORCE

RESTRATION FORCE

RESTRATION FORCE

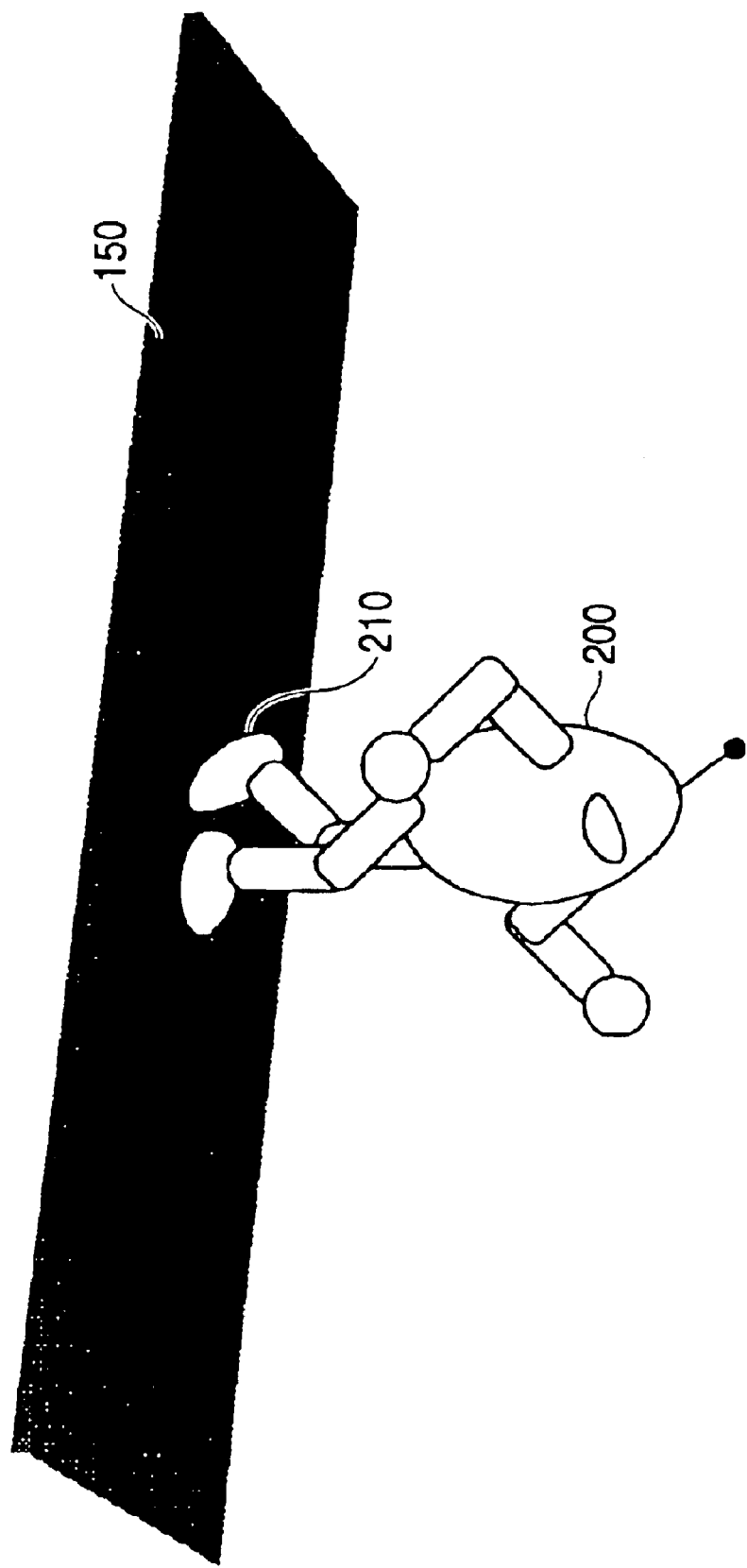

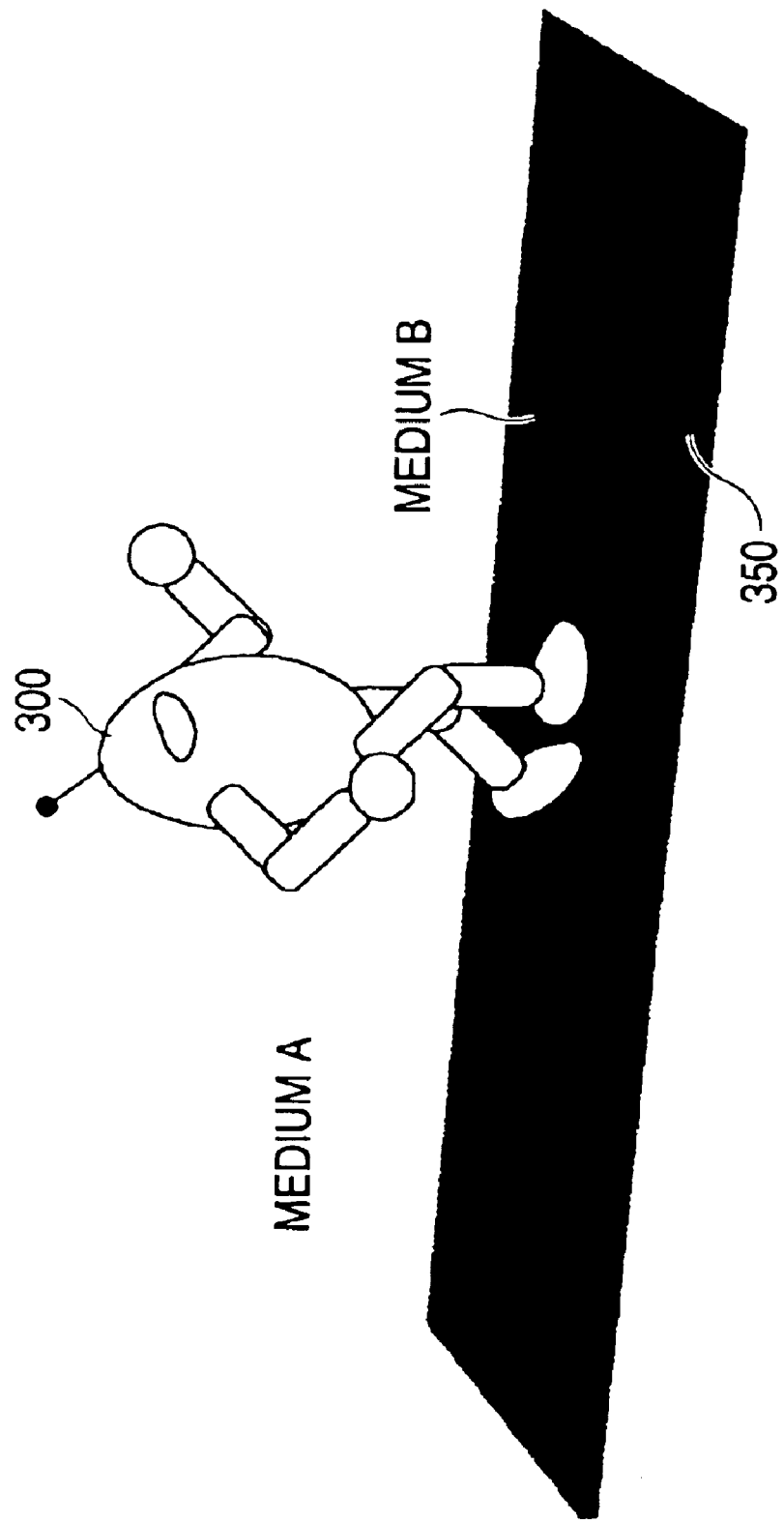

ROBOT SYSTEM

This application is a division of U.S. application Ser. No. 10/096,727, filed Mar. 14, 2002, now U.S. Pat. No. 6,732,015 the entire contents of which are incorporated herein by reference.

BACKGROUND OF THE INVENTION

1. Field of the Invention

The present invention relates to a robot system capable of performing regulated movements, and more particularly, to various types of robot systems which operate within the same activity space as that of a human.

2. Description of the Related Art

In a related-art robot system, a mechanism system having a skeletal frame made of metal or resin is actuated by means of motors, actuators, or engines, which employ various types of power. A required posture of a robot system is maintained through several steps. First, information obtained by way of various internal and external sensors is processed through use of a controller. Here, the controller is mounted on a robot system main unit or outside the main unit and can exchange information with the robot system main unit. Next, restoration force stemming from gravity is utilized by use of a balance controller which issues required instructions to individual drive sections and shifts a corresponding weight, or by loading into a bottom ballast corresponding to a weight sufficient for canceling out a shift of center of gravity in the upper potion. By virtue of these operations, the system requires complex information processing. Further, the robot system is heavy and rigid and poses danger to a human when operated within the same activity space.

In order to prevent such a danger, the robot system must be made slim and slender. However, realization of a slender robot system is difficult in terms of preservation of shape of a structural body. Robot systems, including a walking robot, require integration and appropriate control of a large number of sensor and drive systems for effecting preservation of system posture, stable self-support, and movements. Therefore, a heavy load is imposed on an information processing system, in turn rendering the information processing system bulky and involving consumption of massive amounts of energy. Further, restrictions are imposed on the weight of the overall robot system. Particularly, considerable influence is imposed on a self-supporting system or autonomous system. When restoration force for effecting an attitude control is dependent on a restoration moment stemming from gravity, a robot system is equipped with ballast, thereby rendering the total weight of the robot system heavy.

SUMMARY OF THE INVENTION

An object of the present invention is to provide a robot system which does not requires a complex attitude control system or heavy ballast and maintains a stable posture regardless of whether the robot system is stationary or operating.

In order to accomplish the object, according to the present invention, there is provided a robot system comprising:

at least two segments;

joints for interconnecting the segments;

drive units for actuating the segments;

a controller for controlling the drive units; and a bladder which is provided in at least one of the segments, the joints, the drive units, and the controller and which is filled with a fluid, the fluid being of higher specific gravity than the outside environment.

The robot system possesses a center of buoyancy and a center of gravity which differ from each other. Further, the robot system has a specific gravity of 1 or more relative to the outside environment.

In the robot system, the product of gravitational force and a distance between a ground point (where the system comes into contact with the ground) and the center of gravity is smaller than the product of buoyant force and a distance between the ground point and the center of buoyancy.

In the robot system, the bladder is formed in the segments. The robot system is equipped with a regulator for regulating the amount of fluid filled in the bladder.

The robot system is equipped with a valve for filling the bladder with a fluid or releasing the fluid from the bladder. The valve may be a check valve for preventing outflow of the fluid from the inside of the bladder to the outside.

According to an variation of the present invention, the robot system may be constructed such that one of the segments constitutes a leg section. Buoyant force may be greater than gravitational force so that the leg section can contact a ceiling. Moreover, the robot system may be constructed such that the leg section comes into contact with a water surface.

In the present robot system, the bladder is preferably formed from a flexible material, and the fluid pressure exerted on the inside of the bladder is preferably variable.

The robot system may be equipped with a transceiver for transmitting information to the outside and receiving information from the outside and may be constructed so as to remotely control the drive units.

The robot system is equipped with a power supply unit for supplying energy for driving the drive units.

The robot system has sensors for acquiring information about the inside and outside of the robot system.

Moreover, according to the present invention, there is provided a robot system comprising:

bladders, each having one or more skins and being filled with a fluid having specific gravity higher than that of the outside environment;

a joint structure capable of linking the bladders together;

a drive unit for actuating a bladder or mutually actuating the bladders; and an information processing device for controlling the entire system, wherein the overall robot system has a specific gravity of one or more relative to the outside environment under normal circumstances; the robot system is self-supported while touching a floor at one or several arbitrary points; and the robot system can move as a system.

According to the present invention, the robot system is suspended by means of buoyant force developing in the bladder filled with a fluid having specific gravity lower than that of the outside environment. In the event of occurrence of changes in the posture of the robot system due to movement of the robot system, disturbance, or other forces, a vibration system is formed while an arbitrary ground point on the floor or the center of gravity of the robot system is taken as a neutral point. By means of restoration force stemming from buoyancy, the overall robot system is maintained in a stable attitude.

Simultaneously, the skin of the bladder is strained by the fluid filled therein, thereby generating tensile force. The tensile force imparts required strength, rigidity, and flexibility to respective segments, thereby enabling preservation of the shape of the structural body, self-support, and movements such as walking or leaping action. Further, the segments' flexibility enables absorption of impact force.

The present invention forms a stable system in the form of a light weight, simple robot system through use of restoration force without dependence on gravity. As a result, load imposed on the information processing system is lessened considerably. Of various functions of a skeletal system, the most fundamental role of the skeletal system as a support mechanism is greatly diminished, thereby significantly reducing the weight of the skeletal system. As a result, the weight of the robot system main unit is reduced. Further, there can be provided a robot system which possesses structural strength sufficient for effecting self-support action and movements, is suitable for use in the same environment as that in which humans are present, and does not pose any danger to humans even when the robot system falls to the ground or hits any humans.

BRIEF DESCRIPTION OF THE DRAWINGS

FIG. 35 is a robot system which walks on a ceiling according to an eleventh embodiment of the present invention;

FIG. 39 shows the robot according to the twelfth embodiment when walking on the boundary surface between the medium A and the medium B.

DETAILED DESCRIPTION OF THE INVENTION

By reference to the drawings, embodiments of the present invention will now be described in detail.

Figure 1:
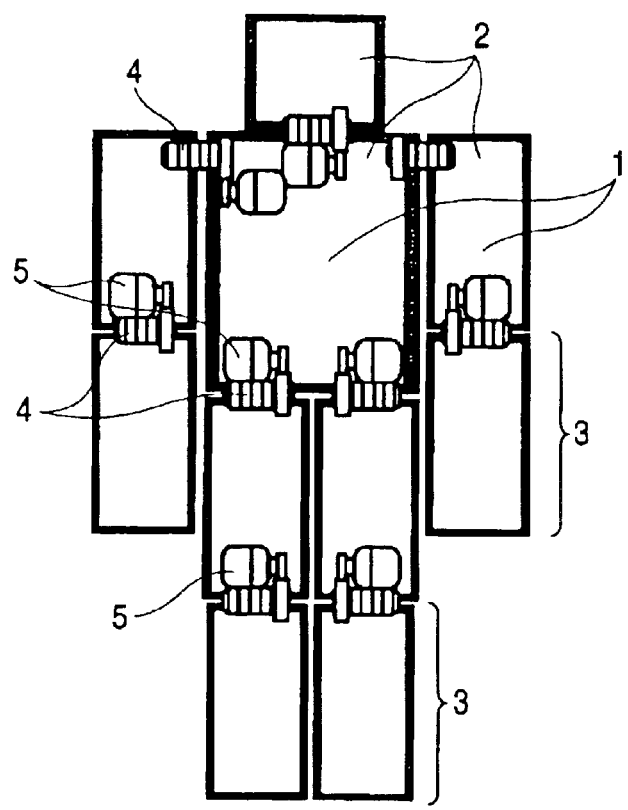
FIG. 1 is a conceptual rendering showing the outline of a mechanical link system and an internal structure of a robot system according to a first embodiment of the present invention.

FIG. 1 is a conceptual rendering showing the outline of a mechanical link system and an internal structure of a robot system according to a first embodiment of the present invention. The robot system has bladders 2 of various sizes and shapes which filled with a fluid 1 being of lower specific gravity than the outside environment. When the robot system is to be used in the atmosphere, a helium gas, a hydrogen gas, or air being of lower specific gravity than the outside environment by virtue of being of higher temperature than that of the same may be employed as the fluid 1. When the robot system is to be employed in water, oil or air being of lower specific gravity than water may also be employed. Segments 3 may be embodied in the bladders 2 or may contain the bladders 2. Link devices (joints) 4 interconnect the segments 3 and enable mutual movement of the segments 3. By means of linking together a required number of segments 3, there can be constituted a self-supportable robot system possessing a predetermined shape and a link system. Drive units 5 effect actuation of the robot system, such as walking and changes in posture of the robot system, by means of moving the segments relatively by way of the link devices 4. The drive units are controlled by a known controller (not shown). Some of the segments may not include bladders, and some bladders may not be covered with segments.

Figure 2:
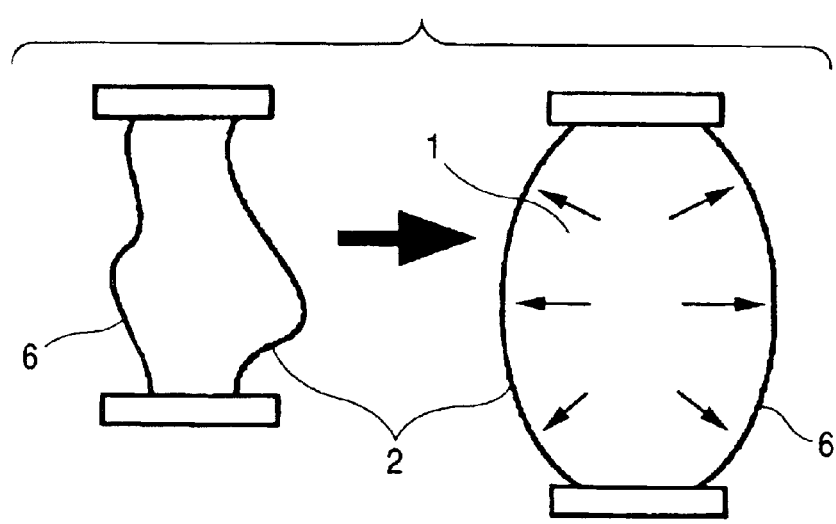
FIG. 2 is a structural conceptual rendering of a bladder shown in FIG. 1.

FIG. 2 is a conceptual drawing showing the structure of the bladder 2 shown in FIG. 1. The bladder 2 has one or more skins 6 and can be filled with the fluid 1. Accordingly, buoyant force can be obtained by means of filling the bladder 2 with the fluid 1 being of lower specific gravity than the outside environment. Preferably, a sewing skin 6 is formed from flexible material. When the sewing skin 6 is formed from flexible material, the bladder 2 is refilled with the fluid 1 from a reserving/generating device for reserving and generating the fluid 1 (hereinafter often called a "fluid reserving/generating device") such as a cylinder, compression of the fluid 1, outflow of the fluid 1 from the inside of the bladder 2 to the outside environment, or shift of the fluid 1 to another bladder 2 can be effected through use of a valve mechanism provided in the bladder 2 and a cylinder piston mechanism for effecting refilling and discharge of the fluid 1. As a result, the pressure of the fluid 1 is set, increased, or decreased, as required, thereby straining or loosening the sewing skin 6. The tensile force of the sewing skin 6 can be set or changed to a desired value. As a result, the strength, rigidity, and impact absorbing force to be imparted to the bladders 2 or the segments 3 can be set or changed to a desired value. The bladders 2 or the segments 3 imparted with required strength or rigidity can be employed as skeletal elements constituting a mechanism system of the robot system.

Similarly, discharging the fluid 1 from the inside of the bladder 2 to the outside environment, refilling the bladder 2 with the fluid 1, compression of the fluid 1, and shifting the fluid 1 to another bladder 2 are effected through use of a valve mechanism, a cylinder piston mechanism, and the device for reserving/generating the fluid 1. Thus, the volume of the thus-filled fluid 1 can be increased or decreased. In association with a change in the volume of the fluid 1, the shape and size of the bladder 2 or that of the segment 3 are changed, as required. In turn, the resultant buoyant force also changes, as required. The rigidity, geometry, and resultant buoyant force of specific parts of the robot system, such as the bladder 2 or segment 3, or those of the entire robot system can be changed, as required. As a result, there can be provided a robot system which has superior mobility and can pass through a narrow area. Alternatively, the robot system fixes its body in a specific location or holds an object of indefinite shape. Further, the volume of the robot system during transport can be reduced.

A fluid source may be provided in the robot system, or may be supplied to the robot system from the outside at all times or when necessary. Control of a fluid may be effected through use of a pressure valve or a check valve using a mechanism or material such as rubber.

In order to enhance the structural strength of the bladder 2, a structural member (e.g., a plastic skeletal frame or beam) may be provided in the bladder 2.

The bladder 2 is formed from a material which is flexible and hermetically seals the fluid 1 stored therein, thereby preventing outflow of the fluid 1 to the outside environment. When the bladder 2 is filled with a helium gas, there can be employed a polymeric material having a high gas barrier characteristic (e.g., EVAL manufactured by KURARAY). Further, the surface of each of the bladders 2 may be coated with aluminum through evaporation, thereby enhancing sealing performance.

Figure 3A:
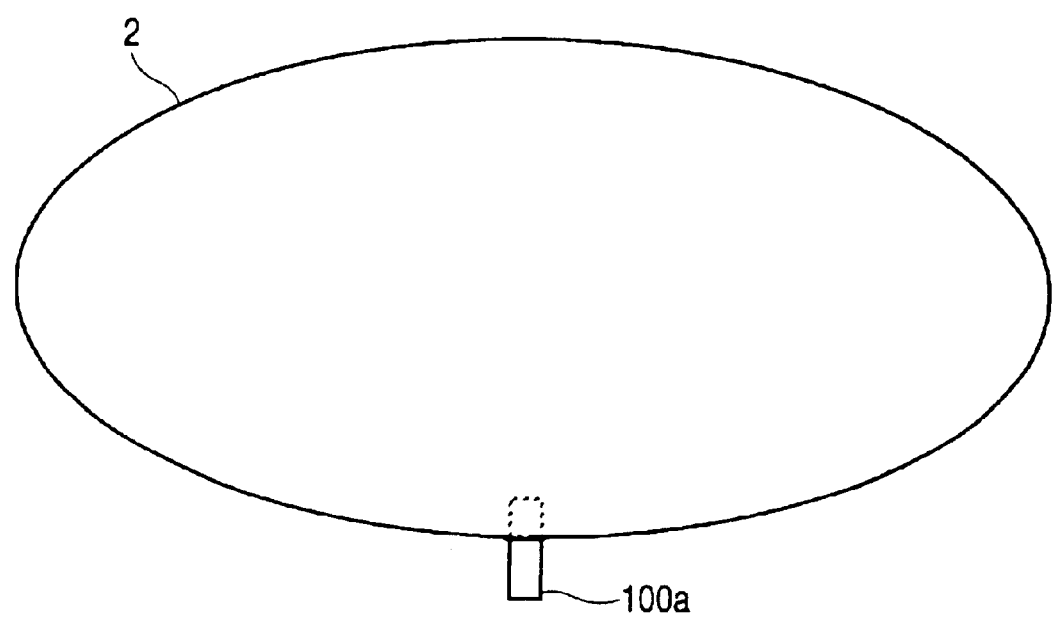
FIG. 3A is an illustration showing a bladder equipped with a check valve.

FIG. 3A shows the bladder 2 having a check valve 100. The check valve 100 enables passage of a fluid in only one direction. The check valve is formed from a cylindrical resilient section made of flexible material, thereby enabling passage of a fluid through a cylindrical portion. The check valve 100 is arranged so as to penetrate through the skin of the bladder 2. The check valve 100 protrudes to both the inside and outside of the bladder 2. Openings of the check valve 100 are located inside and outside the bladder 2. The check valve 100 permits flow of a fluid from the left side to the right side in the illustration and prohibits flow of the fluid from the right side to the left side.

Figure 3B:
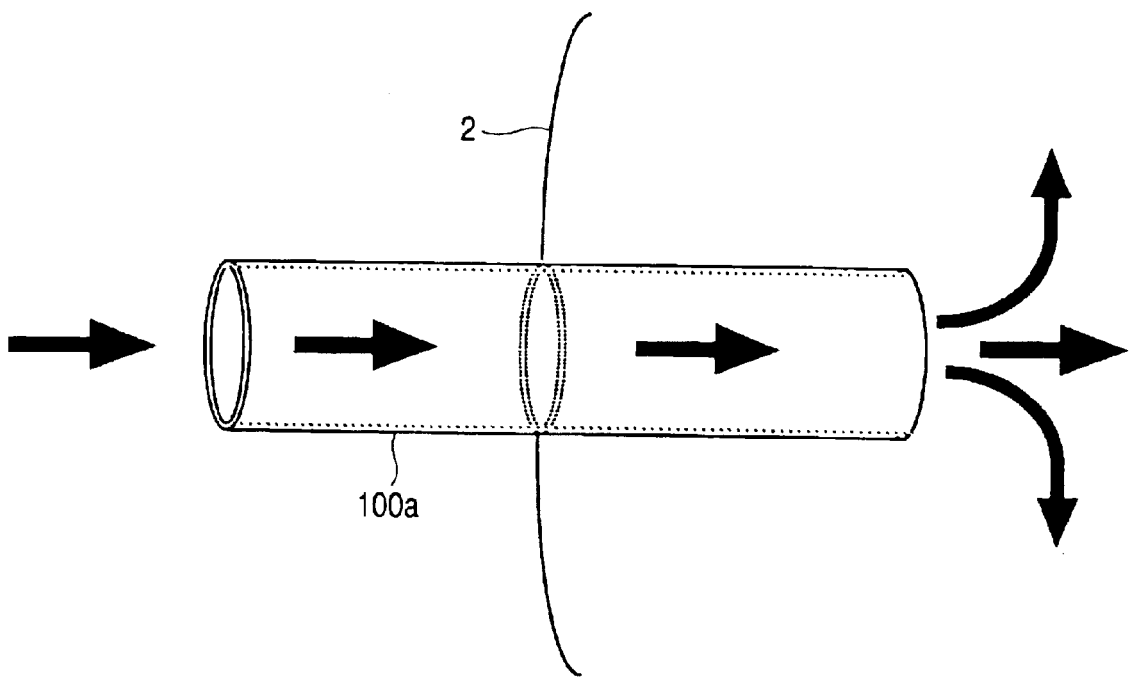
FIGS. 3B and 3C are illustrations showing the structure of the check valve.

FIG. 3B shows that a fluid passes through a check valve 100a from the left side, which enables passage of a fluid. When a fluid flows into the valve 100a from the left side, the check valve 100a expands and enables movement of a fluid from the left side to the right side.

Figure 3C:
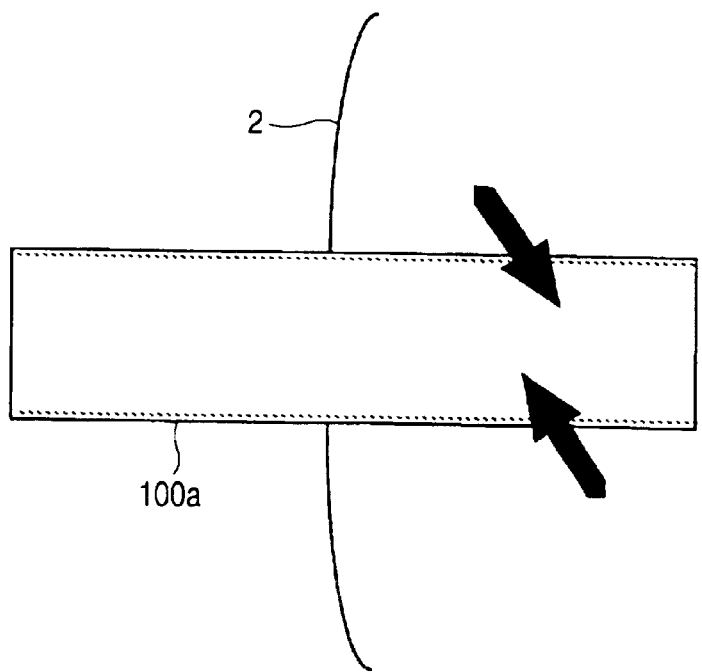

FIG. 3C shows that the fluid 1 is prohibited from passing through the check valve 100a. When the bladder 2 is sufficiently filled with a fluid, the check valve 100a that has projected to the inside of the bladder 2 under pressure from the fluid 1 stored in the bladder 2 receives force from the surface of the check valve 100a, thereby closing the opening of the check valve 100a. The force exerted on the surface of the check valve 100a is greater than the force that attempts to expand the opening of the check valve 100a, thereby prohibiting outflow of the fluid 1 to the outside environment by way of the opening and the check valve 100a from the inside of the bladder 2.

The opening of the check valve 100a facing the outside environment is not necessarily in communication with the outer surface of the sewing skin 6 provided on the surface of the bladder 2. When the bladder 2 is filled with the fluid 1, an unillustrated cylinder piston and the fluid reserving/generating device are connected to the check valve 100a, and the bladder 2 is filled with the fluid 1 under pressure.

Figure 4:
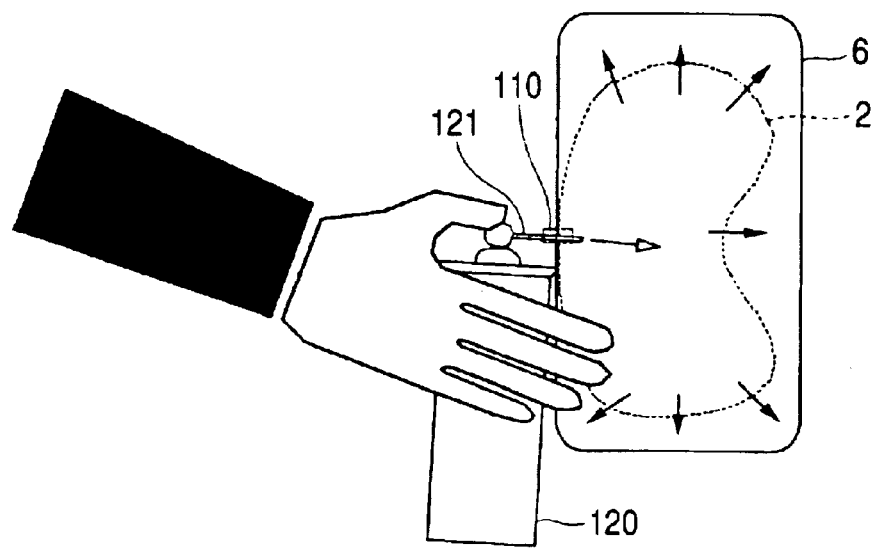
FIG. 4 is an illustration showing filling of the bladder with air through use of a spray can.

FIG. 4 is an illustration showing another example of filling the bladder 2 with the fluid 1. In the example, there is provided a resilient member 110 which establishes communication between the bladder 2 and the sewing skin 6. Here, the resilient member 110 is made of rubber which enables insertion of a needle. In this case, there is employed a spray can 120 having a narrow and sharp fluid discharge port 121. When the bladder 2 is filled with the fluid 1, the fluid discharge port 121 of the spray can 120 penetrates through the resilient member 110, thereby inserting the extremity of the fluid discharge port 121 into the bladder 2. The fluid stored in the spray can 120 is charged into the bladder 2. After completion of the charging operation, the fluid discharge port 121 of the spray 120 is removed from the resilient member 110. The resilient member 110 blocks a communication hole formed by the fluid emission port 121, thereby preventing outflow of the fluid 1 to the outside environment.

Figure 5:
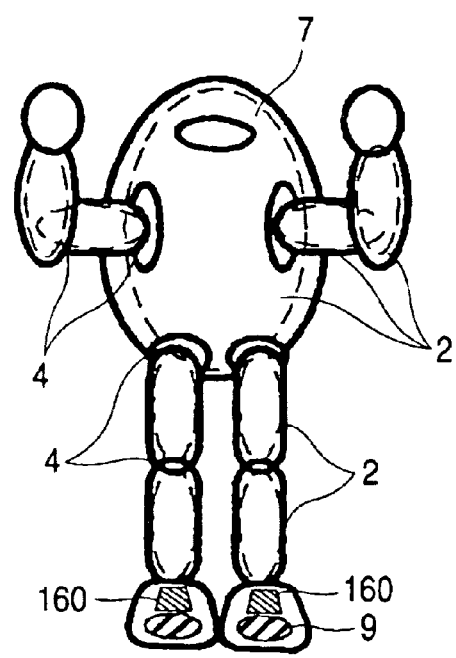
FIG. 5 is an illustration showing a robot main unit when the unit is equipped with built-in reserving/generating devices.

In connection with a method of filling the bladder 2 with the fluid 1, there is shown an example employing a device for reserving/generating the fluid 1 provided outside the robot system. However, the present invention is not limited to this example. The reserving/generating devices may be provided in the robot system. As shown in FIG. 5, the reserving/generating device may be provided in each of the leg sections of the robot system. Alternatively, the bladders 2 and the reserving/generating devices are interconnected through use of unillustrated fluid supply pipes, thereby enabling supply of a fluid, as required.

Figure 6:
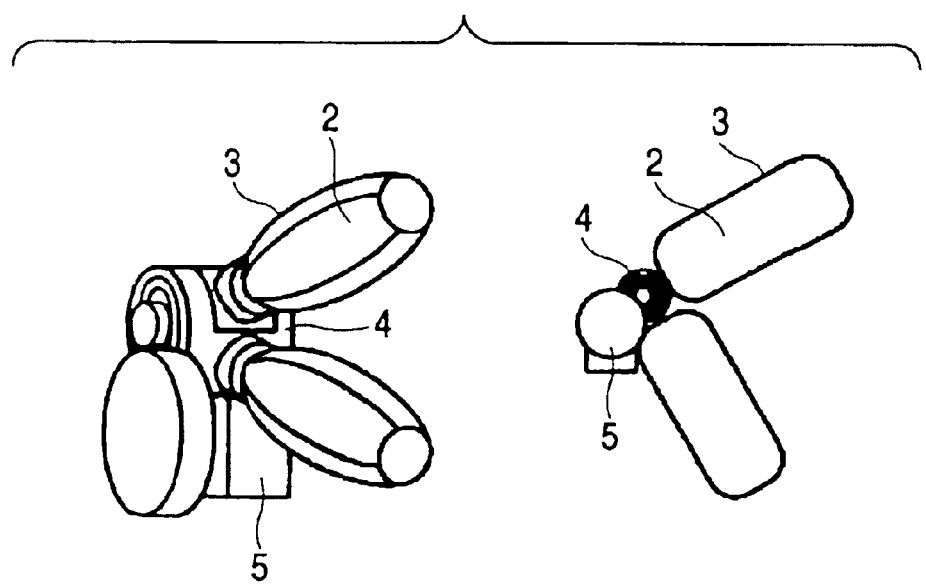
FIG. 6 is a structural conceptual rendering showing a mechanism of the robot system according to the first embodiment.

FIG. 6 is a conceptual rendering showing the structure of a mechanism according to the first embodiment which links together the segments 3 including the bladders 2. The link device 4 is formed from a joint or a flexible hinge which interconnects the bladders 2 or the segments 3 and enables relative movement between the bladders 2 or segments 3. The drive unit 5 is constituted of a spring, a motor/decelerator system, and a fluid pressure actuator and actuates the link device 4, thereby actively and passively actuating the bladders 2 or the segments 3 in a relatively movable manner. The link device 4 and the drive unit 5 may be integrated together, by means of mounting the bladder 2 or the segment 3 directly on the motor/decelerator system. When a fluid pressure actuator is employed, the fluid may be identical with a substance which is charged into a bladder and is employed for producing buoyant force. A valve mechanism, a cylinder piston mechanism, and the fluid reserving/generating device 1 is employed in conjunction with directly the segment 3, thereby discharging the fluid 1 from the inside of the bladder 2 to the outside environment, recharging the bladder 2 with the fluid 1, compressing the fluid 1, and shifting the fluid 1 to another bladder 2. The pressure of the fluid 1 to be used for charging is set, increased, or decreased, as required, whereby variations arise in the posture and shape of the robot system. The link devices 4 may be actuated, to thereby relatively move the segments 3 in association with the variations.

The specific gravity of the robot is preferably about 1 to 1.5 when the robot is to be used in the atmosphere mainly for jumping, flipping, flying, swimming, etc. The specific gravity of the robot is preferably about 1.5 to 3 when the robot is to be used in the atmosphere mainly for stably acting on the ground.

Figure 7:
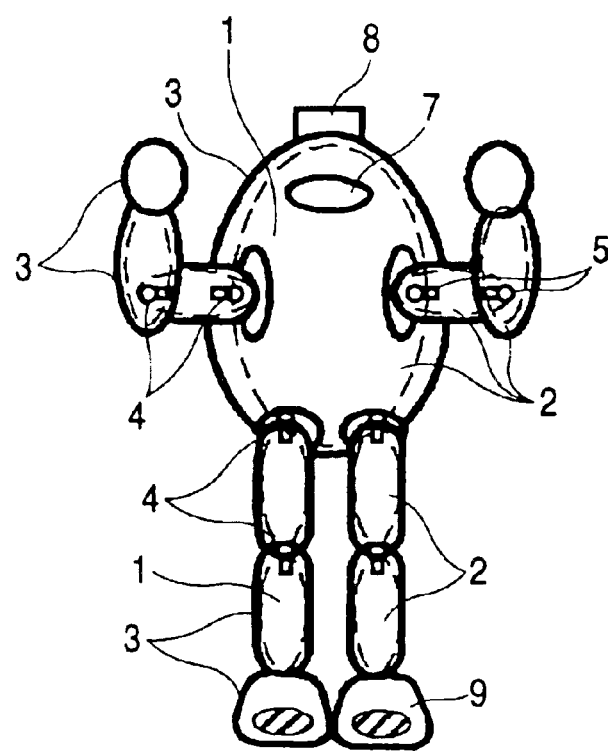
FIG. 7 is a conceptual rendering of a robot system according to a second embodiment of the present invention.

FIG. 7 is a conceptual rendering of a robot system according to a second embodiment of the present invention. The robot system comprises bladders 2; segments 3 formed from the bladders 2 or including the bladders 2; link devices 4, each of which links a required number of the bladders 2 or the segments 3 in an arbitrary combination so as to constitute a predetermined shape and link system and enables mutual link and movement of the bladders 2 or the segments 3; drive units 5 for relatively moving the bladders 2 or the segments 3; a sensor system for collecting various external and internal information items; an information processor 8; and an energy supply system 9.

Figure 8:
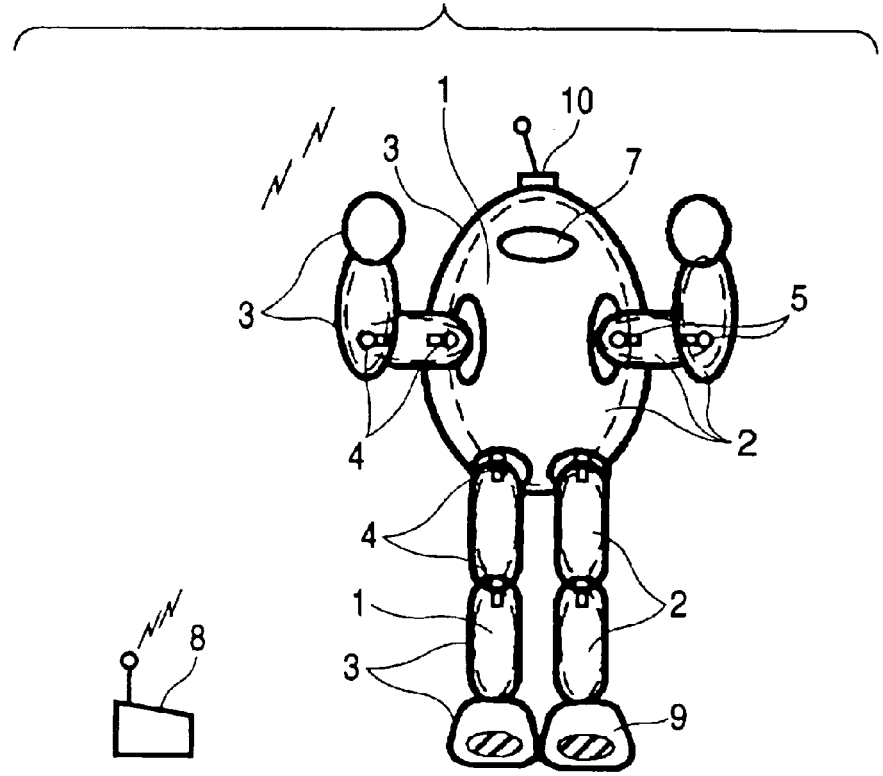
FIG. 8 is a conceptual rendering of a modification of the robot system according to the second embodiment.
Figure 9:
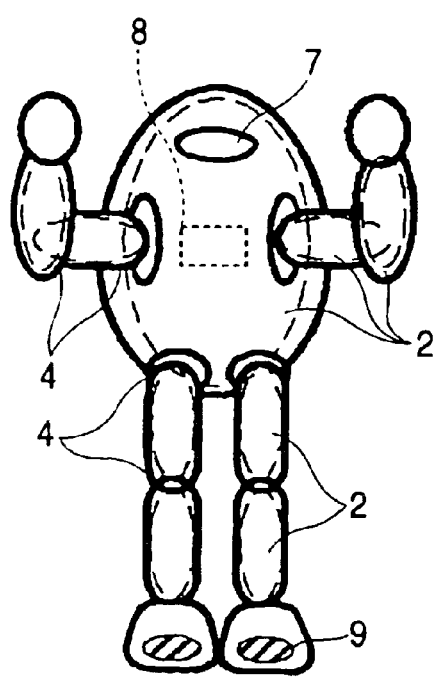
FIG. 9 is an illustration of the robot main unit when the unit is provided with a built-in information processing device.

The segments are relatively moved through use of the drive units 5, thereby realizing a system which performs movements, such as walking or changes in posture, in accordance with an objective. As shown in FIG. 8, the robot main unit is equipped with a transceiver 10. Some or all of elements, such as the sensor system 7, the information processor 8, and the energy supply system 9 are disposed outside the robot system. The robot system may be controlled remotely by means of exchanging information by way of the transceiver 10. In this case, there is yielded an advantage of reducing the weight of the robot system, saving the energy of the robot system, and prolonging an activity time.

Figure 10A:
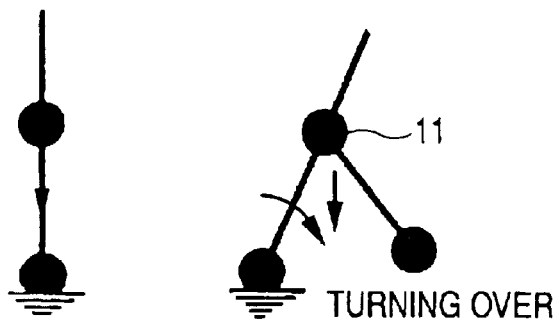
FIGS. 10A through 10C are conceptual schematic representations showing the self-support and stable posture of the robot system according to the second embodiment.
Figure 10B:
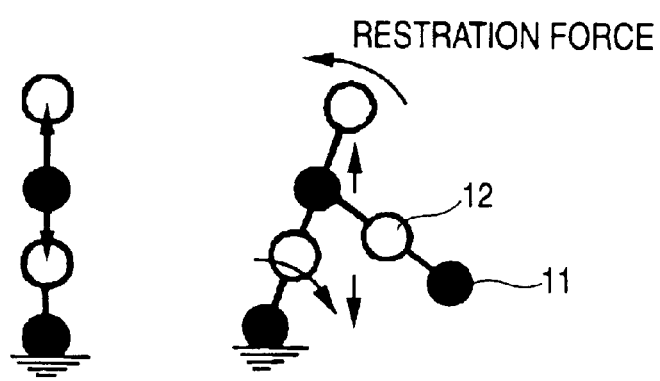
Figure 10C:
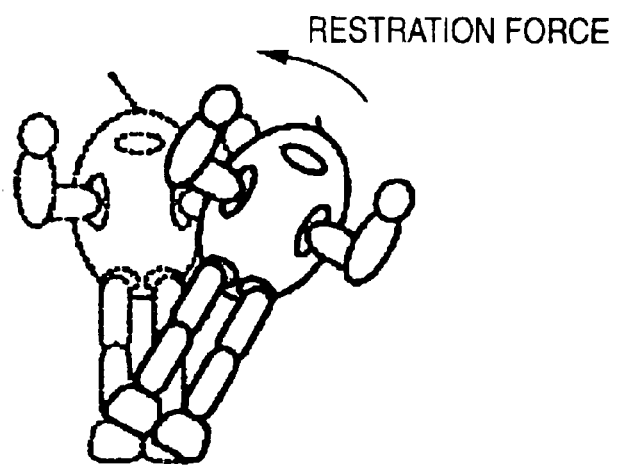

FIGS. 10A through 10C are schematic diagrams showing one example of self-support of the robot system according to the second embodiment and an example of stable posture of the robot system according to the second embodiment. Solid dots 11 shown in the drawings designate gravity acting points, and circles represent buoyant force acting points 12.

As shown in FIG. 10A, the related-art robot system in principle acts as a reverse pendulum. In the related-art robot system, the position of a center of gravity is changed and adjusted by combination of a sensor system, an information processing/control system, and an actuator system, thereby causing the robot system to produce restoration moment under its own weight. Thus, the self-support of the robot main unit is maintained. For these reasons, collection and processing of information and energy consumption impose a heavy load on the related-art robot system. In a system having loaded thereon stationary ballast of sufficient weight, restoration force stemming from the weight of the system acts automatically. In order to ensure resistance to a variety of environments and disturbance, there eventually arises a necessity for very heavy ballast. Such a system is not preferable in terms of an increase in the weight of the overall system, load exerted on a floor, and safety hazard to a person who may approach the system.

As shown in FIG. 10B, the robot system according to the present invention attempts to maintain the self-support of the robot main unit by use of buoyant force produced by the fluid 1 which is filled in the bladders 2 and is of lower specific gravity than the outside environment. In the present invention, restoration movement is caused by a coupling of force between the buoyant force acting on the center of buoyancy of the robot system and gravity acting on the center of gravity of the system, thereby ensuring restoration force. As a result, stability of the system is achieved. In addition to the restoration moment stemming from action of gravity, restoration moment stemming from action of buoyant force is employed, thereby controlling the stability of the robot main unit. Hence, the system can restore itself to a stable posture even when subjected to various changes in posture (FIG. 10C). As mentioned previously, the system is restored by means of restoration force stemming from buoyant force without imposing a load on the sensor system, the information processing/control system, and the actuator system. Consequently, load can be diminished regardless of whether load is exerted on the sensor system, the information processing/control system, or the actuator system, eventually resulting in an improvement in mobility, controllability, and energy consumption. Here, the term "center of gravity" means a point on which the gravity of the overall robot system acts. Further, the term "center of buoyancy" means the center of buoyant force that is a point on which the buoyant force of the overall robot system acts.

If the product of gravitational force and a distance between a ground point (where the system comes into contact with the ground) and the center of gravity of the system is smaller than the product of buoyant force and a distance between the ground point and the center of buoyancy of the system, the robot system can maintain stable posture by means of restoration force stemming from buoyant force.

In the related-art robot system, in the event that the system has remained inoperative or has gone down for reasons unexpected reasons, the self-support and preservation of posture of the robot system become impossible. The posture of the robot system is maintained without imposing a load on the sensor system, the information processing/control system, and the actuator system. Even when the system has remained inoperative or has gone down for unexpected reasons, the posture of the robot system is maintained continuously. Hence, the robot system according to the present invention obviates a risk of turning over and breaking its own system and system surroundings. Further, there is no necessity of providing the robot system with a special dock for stopping and storage purposes and preventing turning over. Hence, safety of the robot system is ensured.

Even if the robot system according to the present invention has come into collision with a floor, a wall surface, a structural object, a human, or another moving substance during operation, the system effects vibration while a ground point on which the system remains in contact with the floor or the center of gravity of the robot system is taken as a neutral point. Thus, the system main unit can recover from collision or physical shock.

Figure 11:
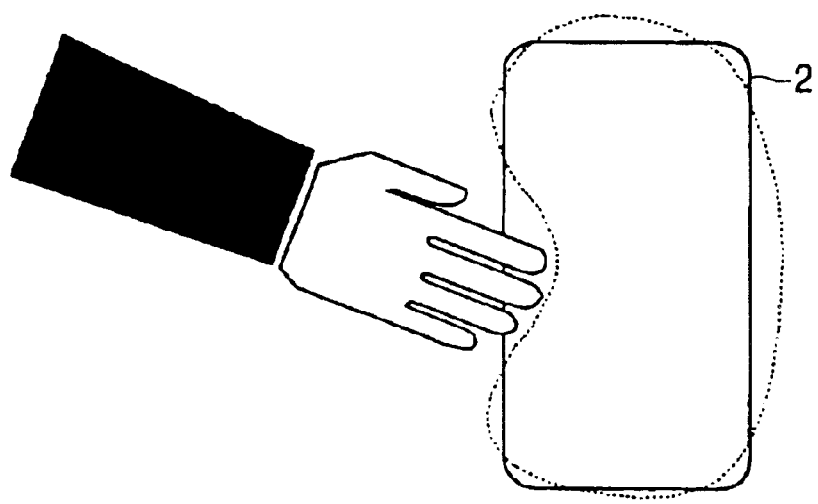
FIG. 11 is an illustration showing the strength of the bladder.

FIG. 11 is an illustration showing that a bladder or segment absorbs physical shock. The robot system according to the present invention is formed from a bladder or a segment made of a soft skin. Moreover, the bladders 2 have a balloon structure filled with the fluid 1. Hence, the bladders 2 have the property of absorbing physical shock. The robot system can prevent damage to the system and/or damage to a floor, a wall surface, a structural substance, a human, or another moving substance, thus ensuring safety. Since the robot system according to the present invention is in principle constituted by combination of the bladders 2 which seal the fluid 1. hence, the overall robot system can be made lighter than the related-art robot system. Particularly, when a gas is employed as a fluid, the weight of the robot system can be made very light.

An ordinary robot is constructed so as to prevent coming into collision with a human, by means of sensing the presence of a human through use of a sensor for ensuring safety when contacting a human. However, in some cases there may arise a situation in which the robot cannot avoid contact with a human, thereby posing the risk of injury to a human body.

Figure 12:
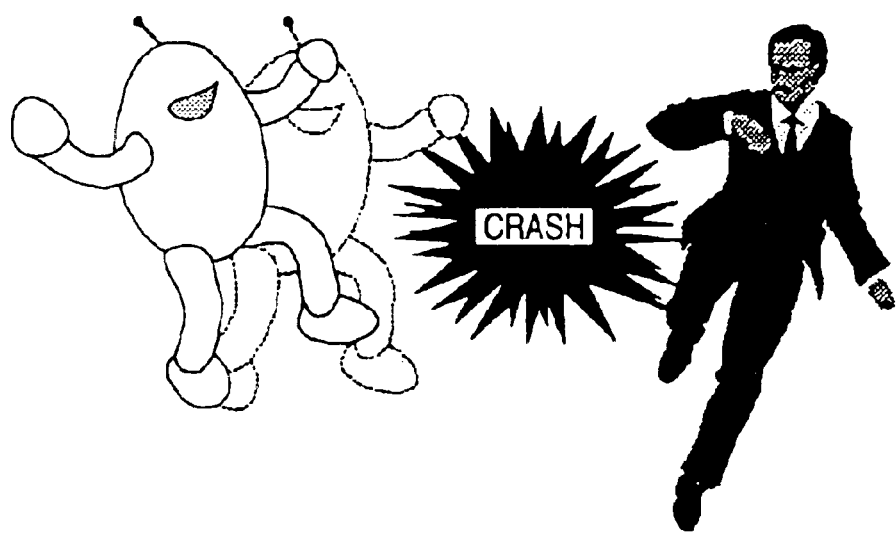
FIG. 12 is an illustration showing a situation in which the robot system is flying when bumping into a human.

However, the robot according to the present invention has a balloon structure. Further, when gas is employed as a fluid, the weight of the robot can be reduced significantly. Hence, as shown in FIG. 12, even if a robot has come into collision with a human, the robot is knocked down by the human, because the robot is lighter than the human. Hence, there can be avoided the risk of posing injury to a human body, which would otherwise be caused when the robot touches a human.

Figure 13:
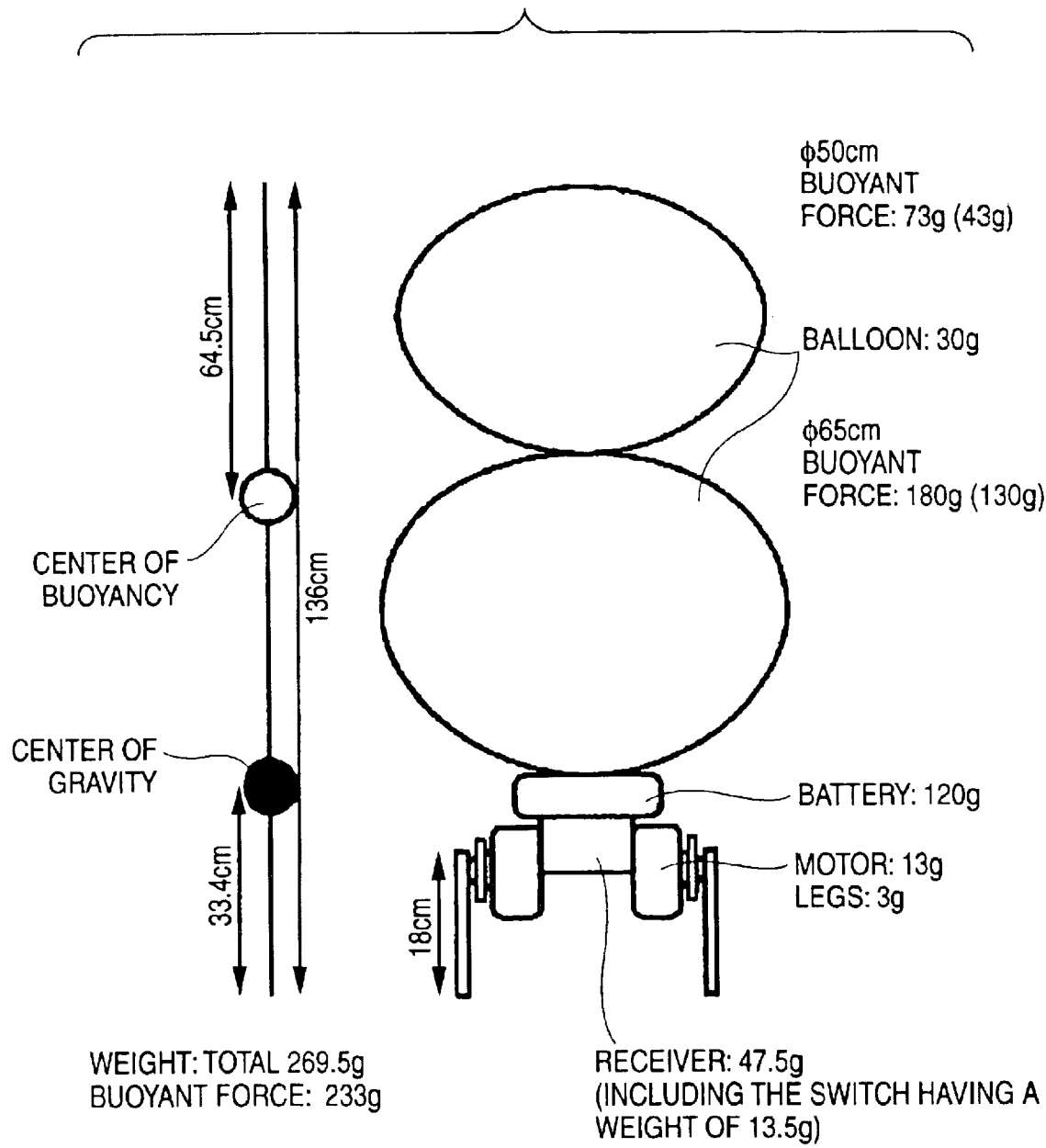
FIG. 13 is a schematic diagram showing an example structure of the robot system according to the second embodiment.

FIG. 13 is a schematic representation showing an example structure of the robot system according to the second embodiment. Since the weight of the overall robot system shown in FIG. 13 is heavier than buoyant force, the robot system remains in contact with the ground. Further, by virtue of the buoyant force produced by a balloon (i.e., a bladder), the robot system can support itself or walk stably. If the robot system does not have any illustrated balloons, no buoyant force acts on the robot system. Hence, the robot system gets out of balance and falls down. Naturally, the robot system cannot walk. As mentioned above, in the present embodiment, the robot system maintains a stable posture regardless of whether the robot is stationary or operating, without a necessity for a complex attitude control system or heavy ballast.

FIGS. 14 through 21 show the concept of movement of the robot system which is shown in FIG. 7 and has been described in connection with the second embodiment.

Figure 14:
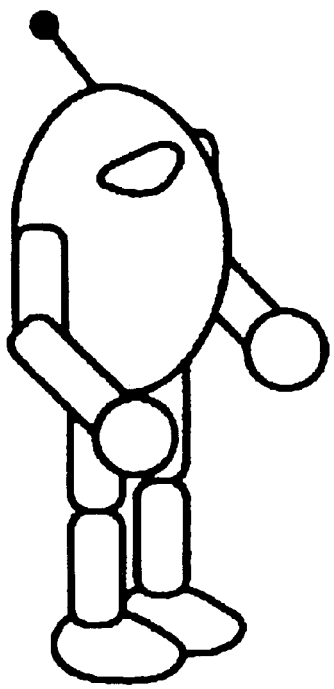
FIG. 14 is a conceptual rendering showing a robot system of two-legs self-support type according to the second embodiment.
Figure 15:
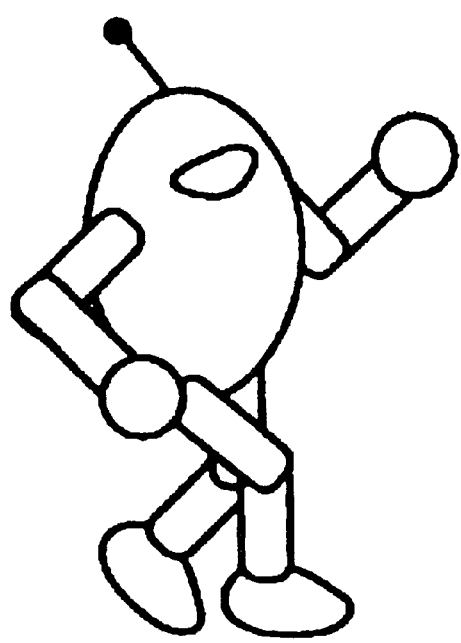
FIG. 15 is a conceptual rendering showing walking of the robot system according to the second embodiment.
Figure 16:
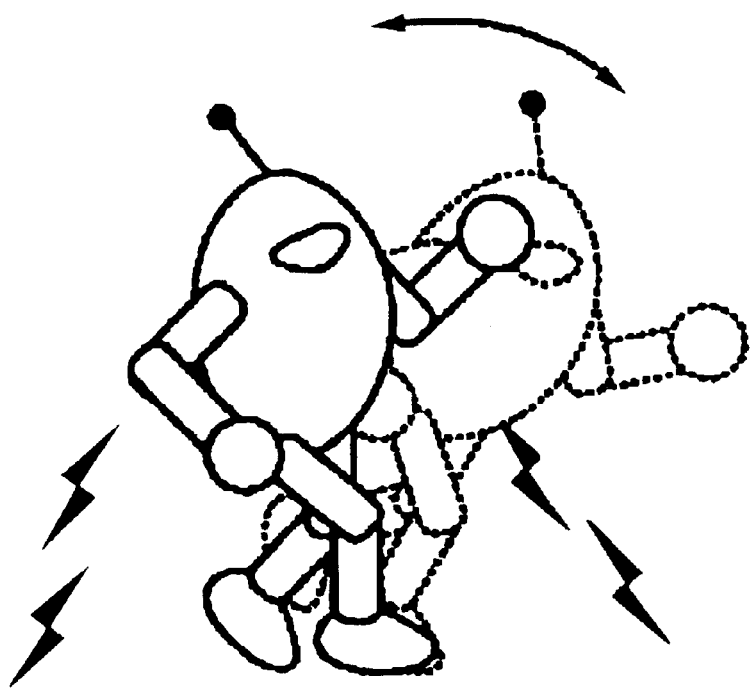
FIG. 16 is a conceptual rendering showing walking of a related-art robot system.
Figure 17:
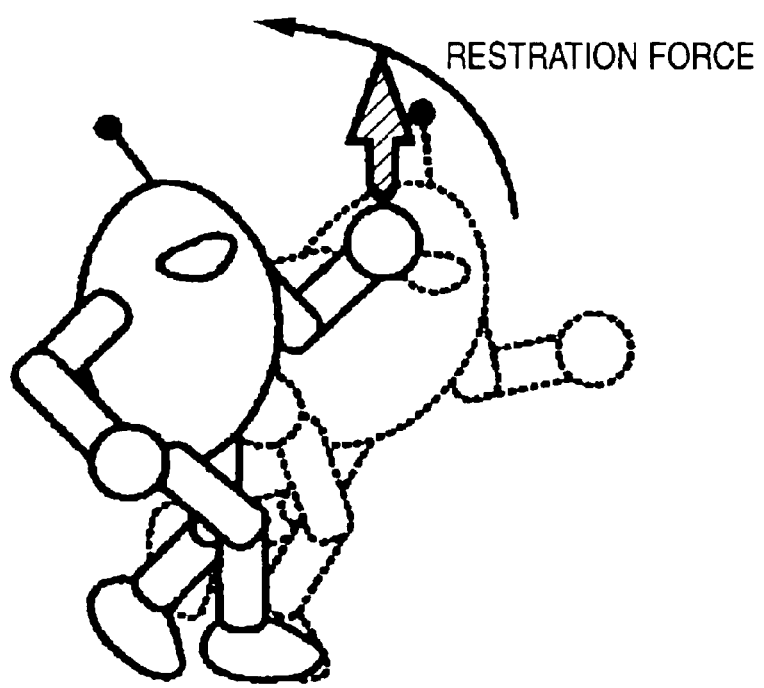
FIG. 17 is a conceptual rendering showing walking of the robot system according to the second embodiment.
Figure 18:
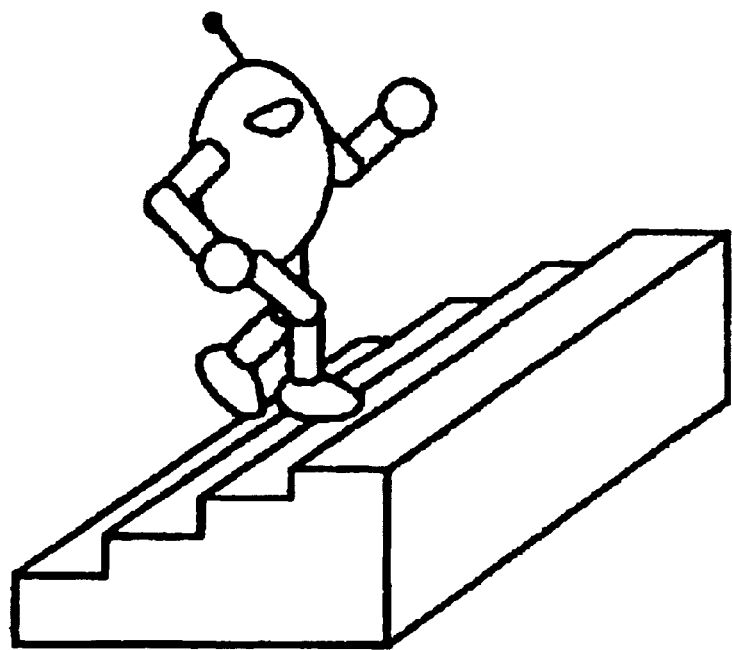
FIG. 18 is a conceptual rendering showing stair-climbing action of the robot system according to the second embodiment.

As shown in FIG. 14, the robot system constitutes a robot system of two-leg self-support type like a humanoid. As shown in FIG. 15, the robot system can walk through use of two legs, as a human does. FIG. 16 shows a case in which an attempt is made to provide the related-art robot system with an analogous two-leg walking system and to cause the robot system to walk. In a case where the related-art robot system is caused to perform walking action, variations in the point of center of gravity resulting from action are incessantly ascertained. The thus-ascertained variations are processed by means of an information processing device, thereby sending appropriate instructions to individual actuators. Thus, prevention of toppling-over of the robot system and preservation of posture of the same involve heavy load. FIG. 17 shows a case where the robot system according to the present invention attempts to perform walking action. In relation to the robot system according to the present invention, toppling-over of the robot system is prevented at all times by the restoration force stemming from buoyant force. Hence, the robot system can effect walking action easily. Consequently, the robot system can perform climbing action, including stair-climbing action such as that shown in FIG. 18, over undulations of a floor without involvement of special control operation and without a risk of turning over.

Figure 19:
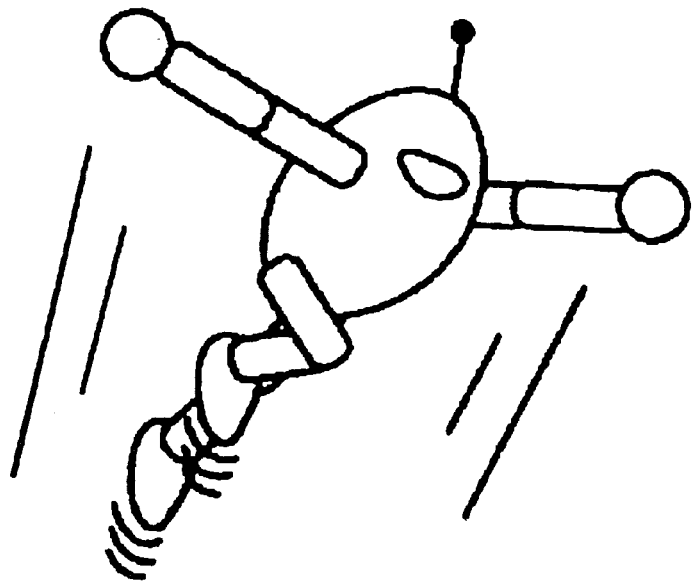
FIG. 19 is a conceptual rendering showing leaping action of the robot system according to the second embodiment.
Figure 20A:
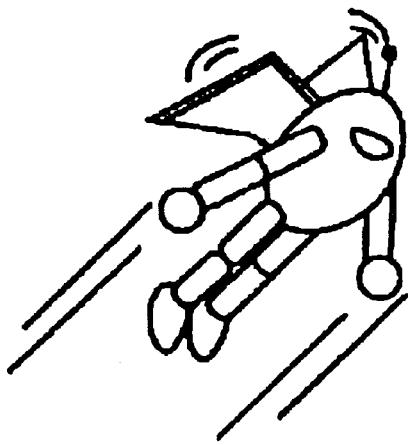
FIGS. 20A through 20C are conceptual renderings showing flying and swimming actions of the robot system according to the second embodiment.
Figure 20B:
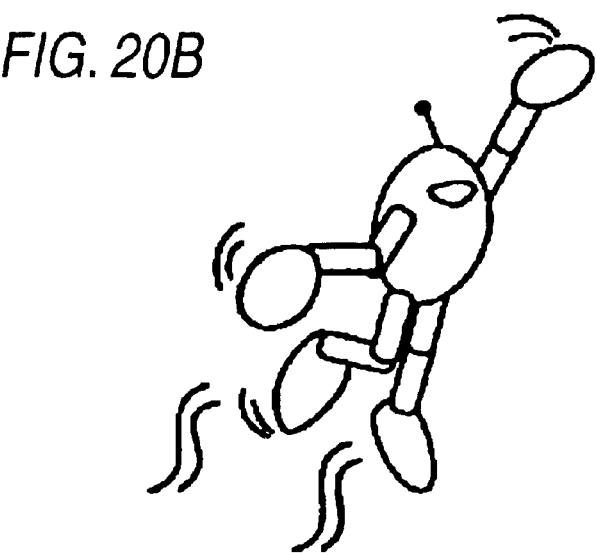
Figure 20C:
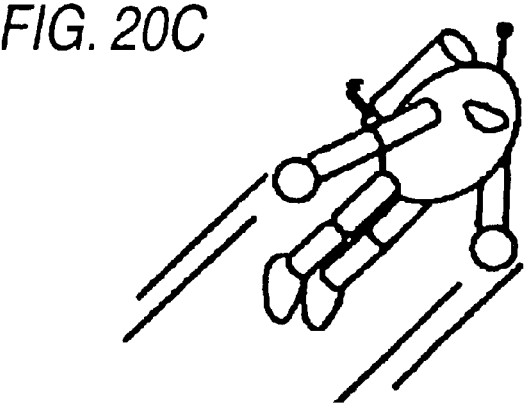
Figure 21A:
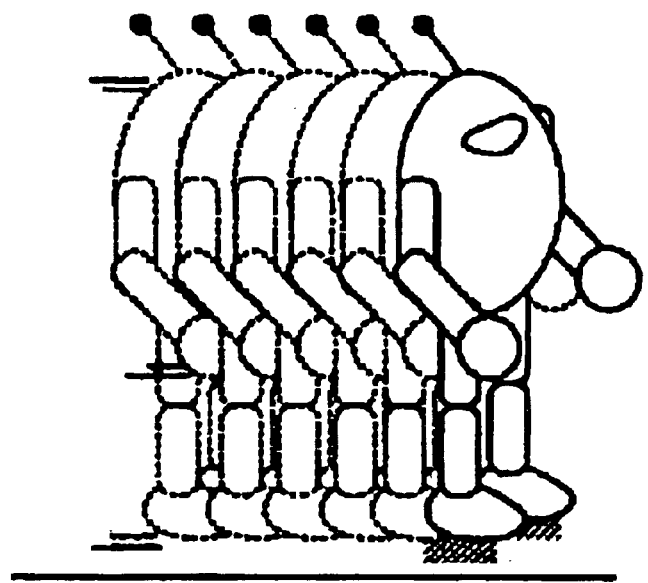
FIGS. 21A and 21B are conceptual renderings showing levitating and floating actions of the robot system according to the second embodiment.
Figure 21B:
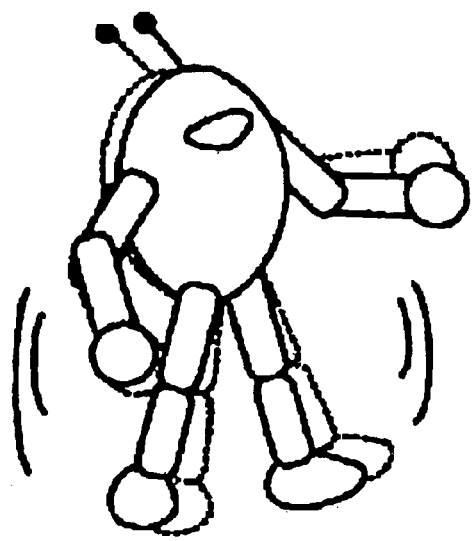

FIG. 19 shows leaping action of the robot system. Since the robot system is lightweight, the robot system can readily perform leaping action. Since bladders and segments have the property of absorbing physical shock, there is a small risk of the robot system being damaged when landing. Further, there is no necessity of performing a special landing operation through mechanical control or lessening inertial shock. As shown in FIGS. 20A through 20C, if the robot system is equipped with wings (see FIG. 20A), fins (see FIG. 20B), or various thrusters (see FIG. 20C) or if the buoyant force of the robot system is adjusted, the robot system can perform flying or swimming action or floating action as shown in FIGS. 21A and 21B (i.e., FIG. 21A shows levitating action, and FIG. 21B shows floating action).

Figure 22A:
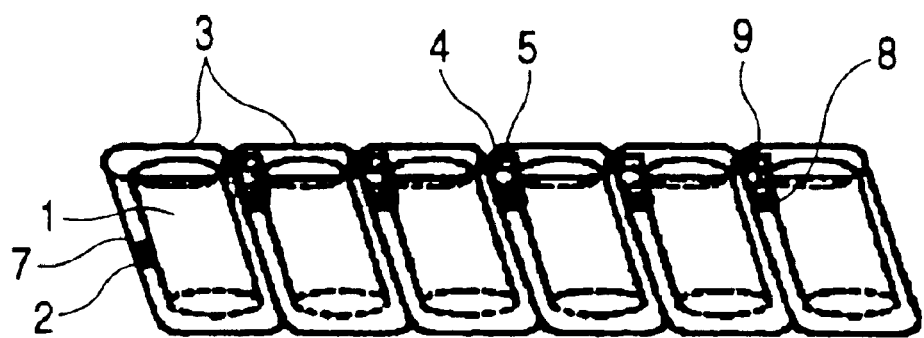
FIGS. 22A and 22B are conceptual renderings showing a robot system according to a third embodiment of the present invention.
Figure 22B:
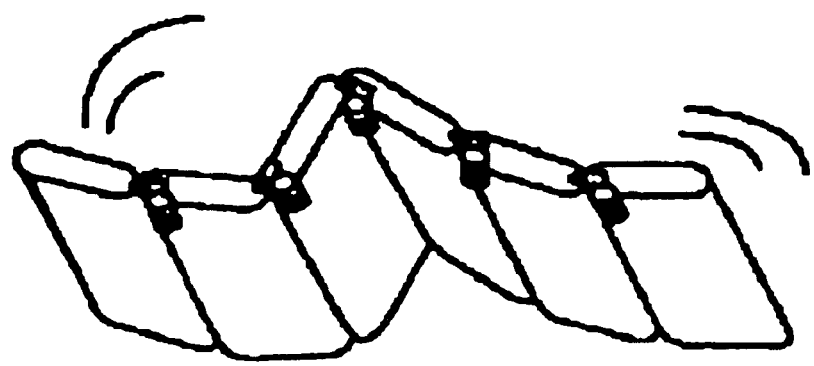
Figure 23A:
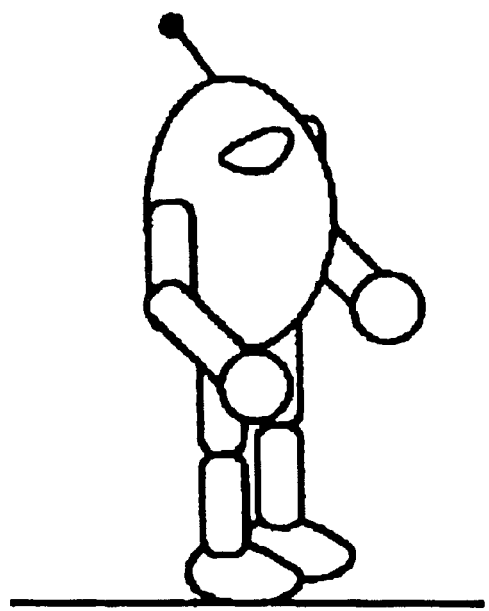
FIGS. 23A and 23B are conceptual renderings showing changes in posture stemming from a shift in the center of gravity of the robot system according to the second embodiment.
Figure 23B:
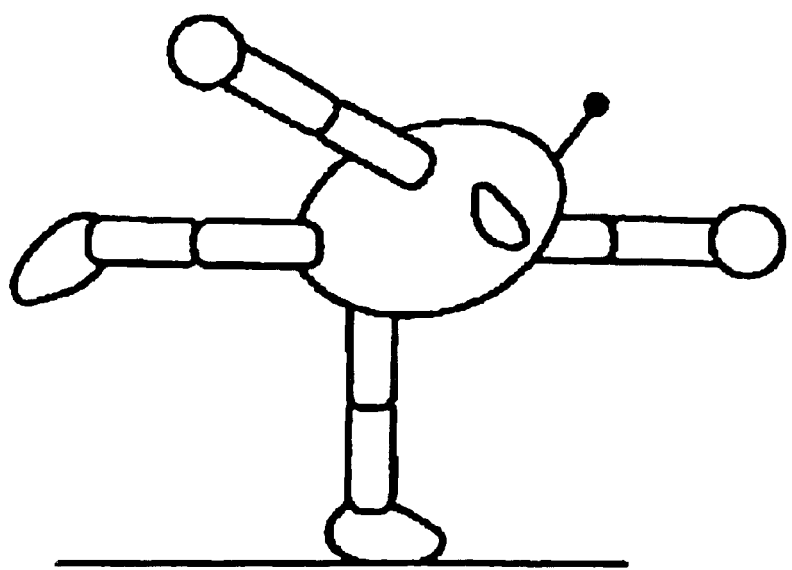

FIGS. 22A and 22B are conceptual renderings of a robot system according to a third embodiment of the present invention. The robot system comprises the bladders 2; the segments 3 formed from the bladders 2 or including bladders 2; the link devices 4 each linking together a required number of bladders 2 or segments 3 in the form of a reed screen, thereby constituting a linked system of predetermined shape and enabling mutual link and movement of bladders 2 or segments 3; drive units 5 for causing the bladders 2 or the segments 3 to move relatively; the sensor system 7 for collecting various internal and external information items; the information processor 8; and the energy supply system 9. In the present embodiment, the segments 3 are sequentially and mutually moved through use of the drive units 5, as a result of which the overall robot system forms a progressive wave and performs movement.

FIGS. 23A and 23B and FIGS. 24A and 24B are conceptual renderings showing movements of the robot system according to the second embodiment shown in FIG. 7.

Figure 24A:
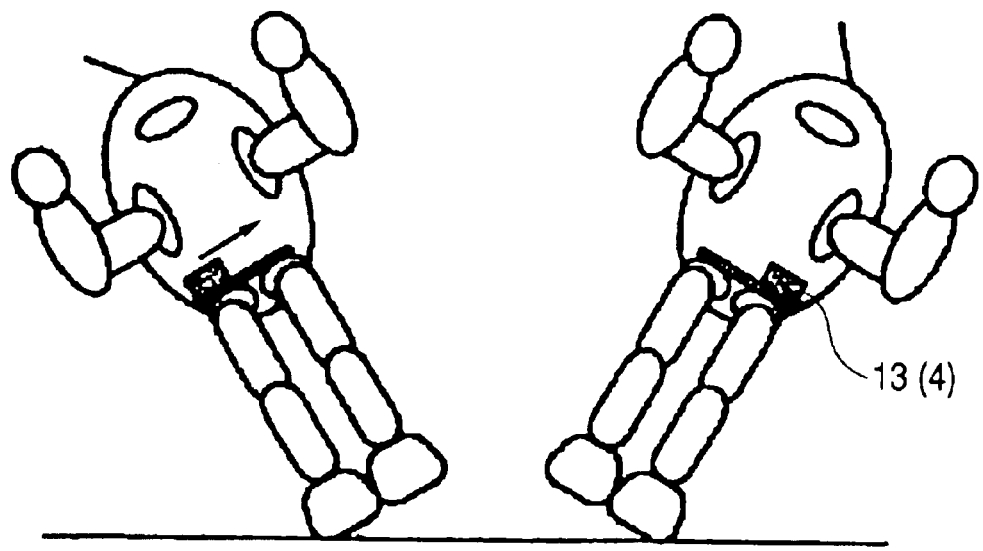
FIGS. 24A and 24B are conceptual renderings showing changes in posture stemming from a shift in the center of gravity of the robot system according to the second embodiment.
Figure 24B:
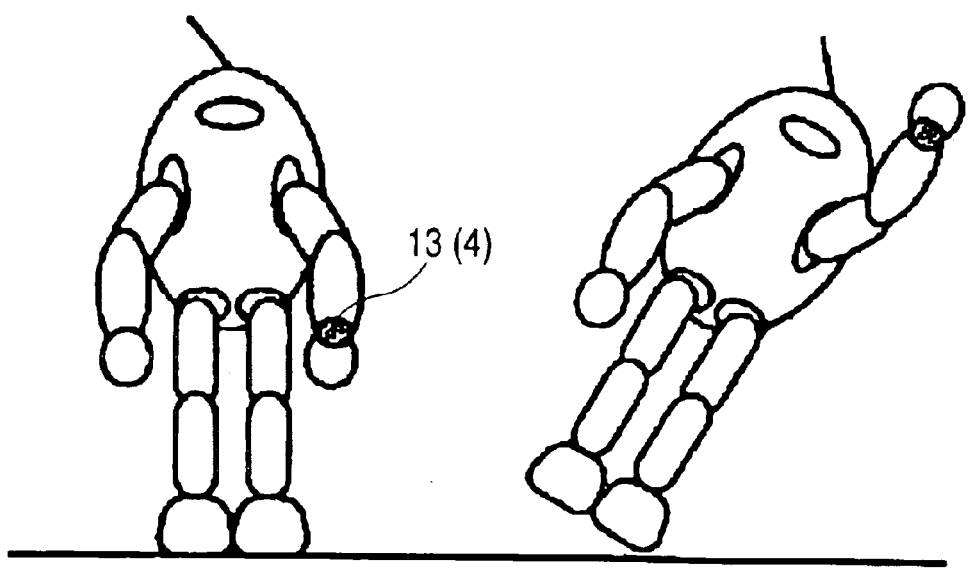

As shown in FIGS. 23A, 23B, 24A, and 24B, the center of gravity of the robot system is shifted or the relative position of center of gravity is changed. If necessary, increasing or decreasing the pressure of the fluid 1 charged in the bladders 2, shifting the fluid 1 to another bladder, discharging the fluid 1 to the outside environment, or recharging the bladders 2 with the fluid 1 is effected by use of a valve mechanism or a cylinder piston mechanism, thereby adjusting the buoyant forces of individual bladders. The center of gravity of each of the bladders, that of each of the segments, that of the overall robot system, the position of the center of buoyancy, and the weight and buoyant force of the robot system are changed by use of a single operation of the foregoing operations or by use of the foregoing operations in combination. As a result, neutral posture which would be assumed when the robot system is actuated or stopped by means of restoration force can be changed freely from the posture shown in FIG. 23A to that shown in FIG. 23B. At this time, the present robot system is characterized by not requiring consumption of energy for continuously maintaining neutral posture of the system. As shown in FIG. 24A, a movable mass 13 to be used for changing the position of center of gravity may be embodied by provided the robot system with a dedicated integrated mass. Further, as shown in FIG. 24B, the movable mass 13 may double as any of various system-equipped devices, such as a link device, a drive unit, or an energy supply system. Further, a dedicated drive unit may be provided for shifting the movable mass 13. Alternatively, there may be employed active or passive operation of a system link device.

Figure 25:
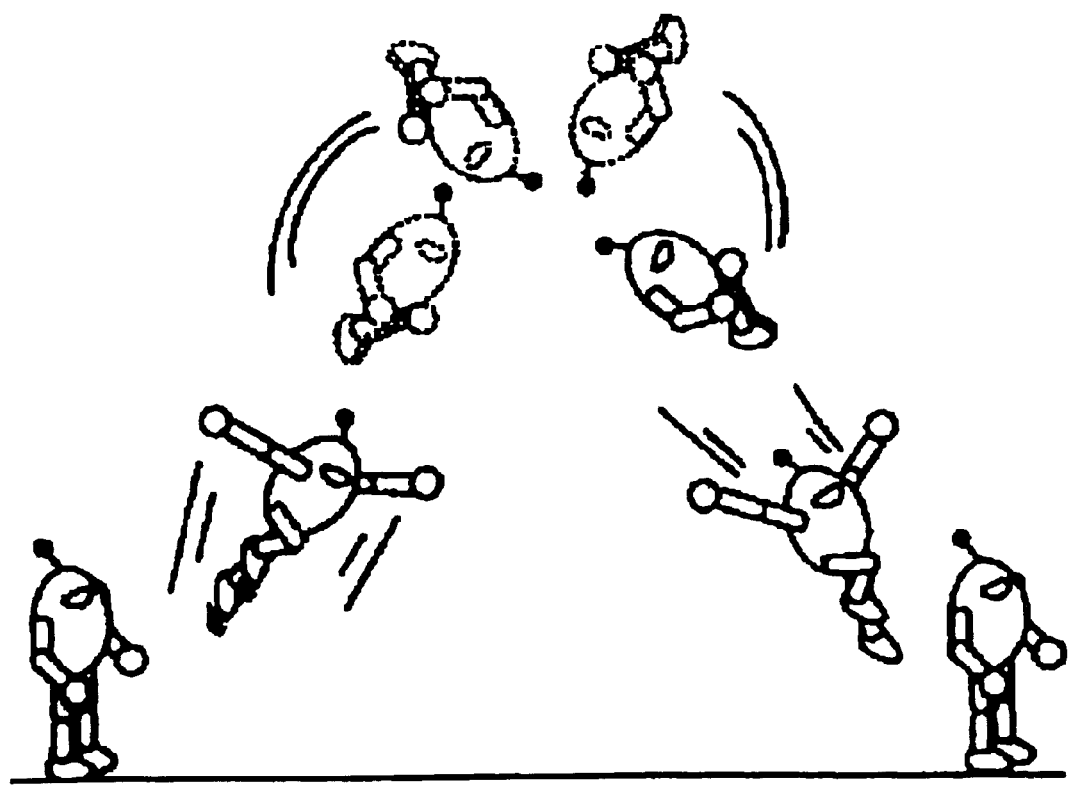
FIG. 25 is a conceptual rendering showing acrobatic action of the robot system according to the second embodiment.

Reversal of direction or posture of the robot system or twisting action of the same is made possible by means of the movable mass. By means of combination of various actions such as leaping action, the robot system can readily perform acrobatic action such as loop action or spin action. FIG. 25 shows an example acrobatic action.

Figure 26:
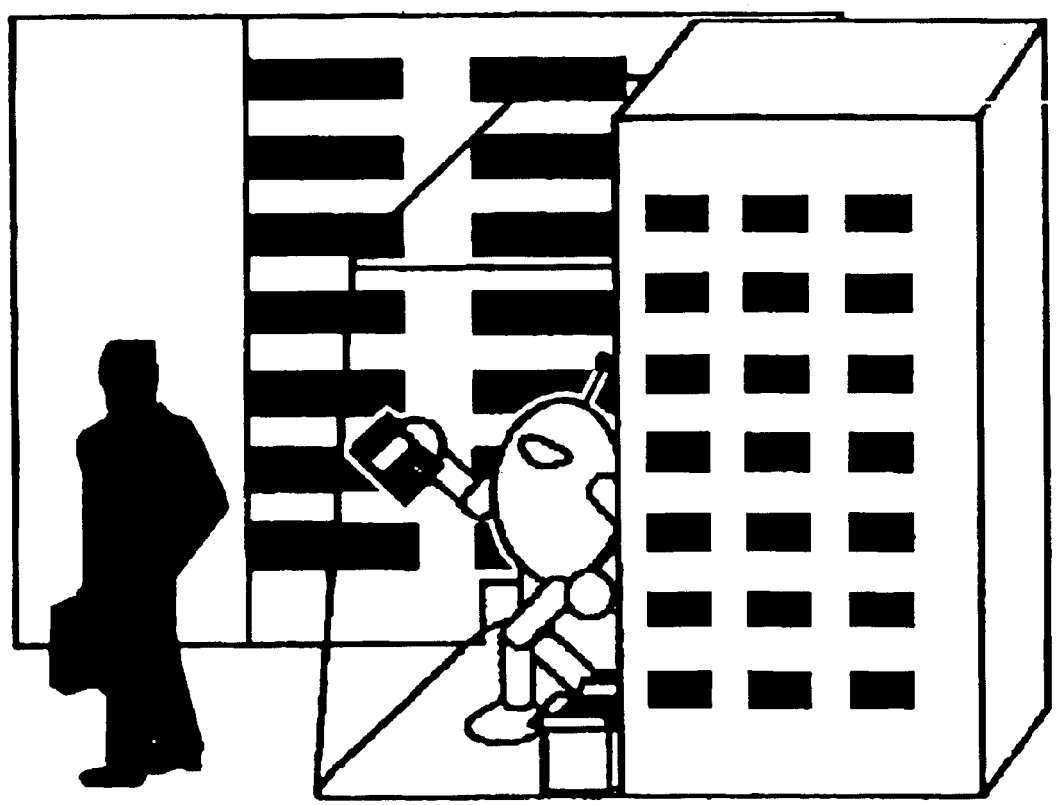
FIG. 26 is a conceptual rendering showing a movable display robot which is one example of the robot system according to the second embodiment.

As has been described, the robot system according to the present embodiment is lighter than the related-art robot system and readily maintains its posture. Hence, the robot system can show variety and preeminent mobility. FIG. 26 shows the robot system that is shown in FIG. 7 and has been described in connection with the second embodiment, when the system acts as a movable display robot in a show window or a shop. Use of the robot system provides observers with a variety of points of view as compared with use of mannequins. The robot system also has features, such as an incentive effect stemming from motion of the robot, or instruction, guidance, and escort effects.

Figure 27:
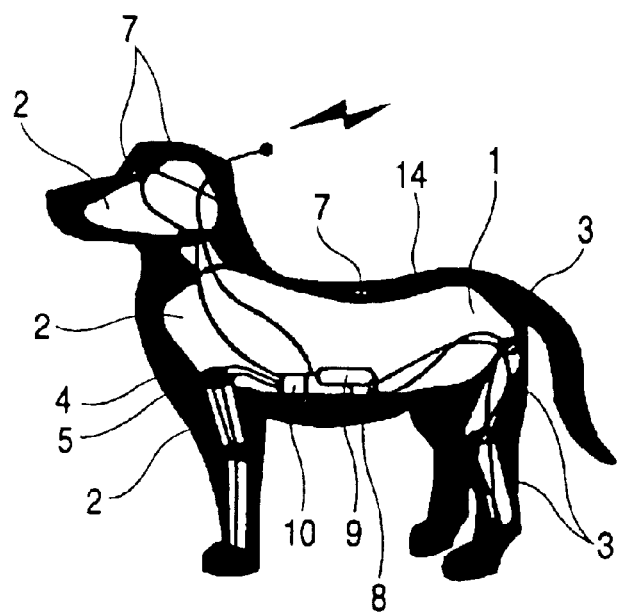
FIG. 27 is a conceptual rendering of a robot system according to a fourth embodiment of the present invention.

FIG. 27 show s a domestic pet robot, which is a robot system according to a fourth embodiment of the present invention.

The robot system comprises the bladders 2; the segments 3 formed from the bladders 2 or including bladders 2; the link devices 4 which each link together a required number of bladders 2 or segments 3 in an arbitrary combination, thereby constituting a linked system of predetermined shape and enable mutual link and movement of bladders 2 or segments 3; the drive units 5 for causing the bladders 2 or the segments 3 to move relatively; the sensor system 7 for collecting various internal and external information items; the information processor 8; the energy supply system 9; and a sewing skin 14 for imparting an arbitrary outer shape to the robot system. The segments 3 are moved mutually through use of the drive units 5, thereby realizing a robot system which performs action, such as walking or changes in posture, in compliance with an objective. The sewing skin 14 may be common to or identical with a skin of the bladder 2 or a skin of the segment 4. Further, the sewing skin 14 may be the skin of the bladder 2 or the skin of the segment 3.

The robot system according to the present invention readily maintains a posture readily and is susceptible to considerably smaller restrictions than those to which the related-art robot system is susceptible, in terms of appearance or a link/mechanism system. By means of selecting the sewing skin 14, as required, there can be readily formed a movable robot system having any of various shapes, the shapes imitating a cartoon character, a TV character, a character product, a creature, an imaginary monster, or an inanimate object. The thus-formed robot system is lightweight and involves no risk of posing heavy load or damage to a floor of a building. Further, the robot system can move in accordance with undulations and steps. Hence, the robot system can be actuated within an ordinary building or house. Further, the robot system has a flexible structure, and there is a very low risk of posing injury to a human or damaging instruments or the system even when the robot system has come into contact with a human, instruments located around the system, or a wall surface. Hence, the robot system can ensure safety.

Figure 28:
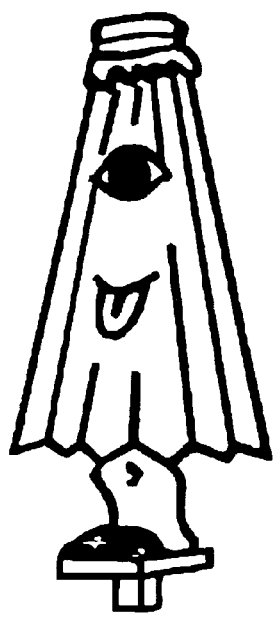
FIG. 28 is a conceptual rendering of a robot system according to a fifth embodiment of the present invention.
Figure 29:
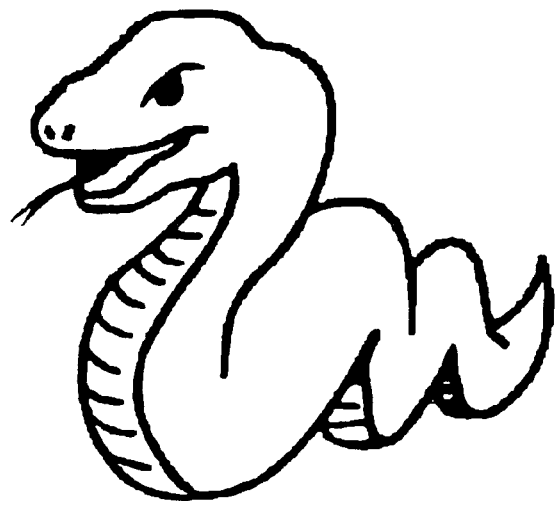
FIG. 29 is a conceptual rendering of a robot system according to a sixth embodiment of the present invention.
Figure 30:
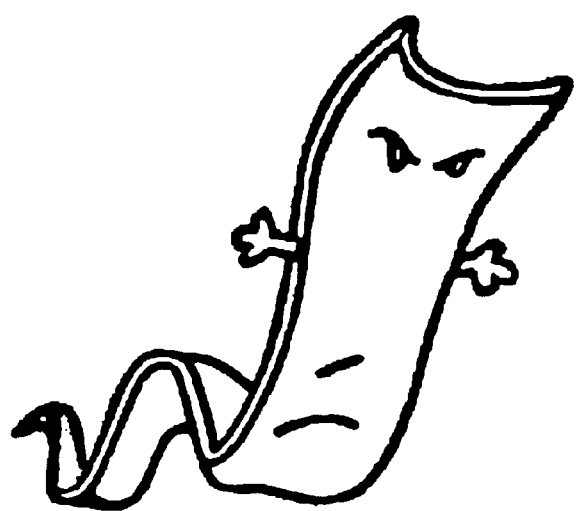
FIG. 30 is a conceptual rendering of a robot system according to a seventh embodiment of the present invention.

For instance, a related-art robot system which is shown in FIG. 28 and supports itself by means of a single leg has an unstable shape. Even in the case of such an unstable shape, there can be constructed a single-leg self-support robot system capable of safely sustaining its posture. Attractive movement, such as leaping action, which makes full use of the shape of a single-leg self-support robot, can be imparted to the robot system. Alternatively, as shown in FIG. 29, there can readily formed a robot system such as a snake robot which moves while undulating in the manner of a monster serpent or a dragon. Alternatively, as shown in FIG. 30, there can be readily formed a sheet-like flat robot system. The robot system can readily perform peculiar movement, such as heaving movement. Thus, the robot system can be made attractive.

Figure 31:
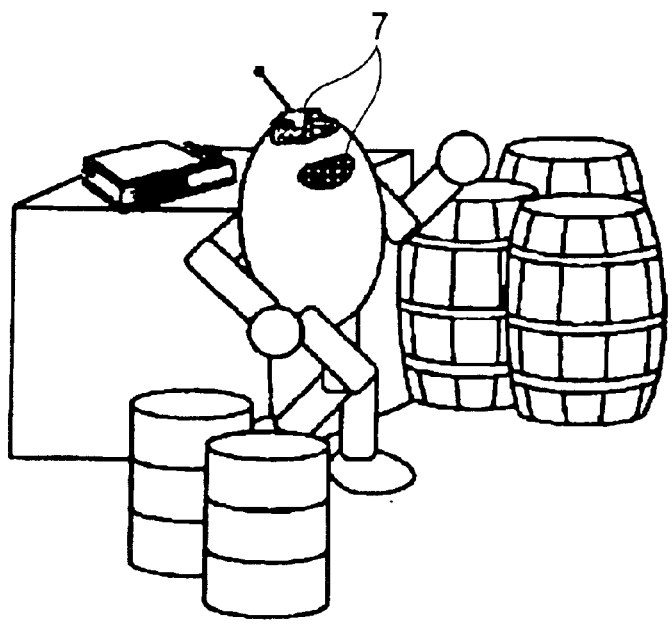
FIG. 31 is a conceptual rendering showing a patrol robot which is a modification of the robot system according to the second embodiment.

FIG. 31 shows a patrol robot which is one modification of the robot system according to the second embodiment shown in FIG. 7. The robot system is formed so as to be equipped with sensors the robot system according to the second embodiment shown in FIG. 7 requires in order to perform patrol operation. The robot system can be operated as a patrol, monitoring, and inspecting robot which finds, reports, monitors, and tracks down a suspicious trespasser or anomalies through use of the sensor system 7 or which patrols, monitors, and records the situation of a house from the outside through use of the sensor system 7.

The robot system can move and hence provides a variety of and flexible points of view as compared with those provided by a monitor camera fixed on a pan head. In contrast with a human, even if an unexpected event has arisen, the robot system can rush to the scene of the event without regard for its own safety and can track down a target as the target moves. In addition, when a robot system is constructed as an autonomous system, the robot system constitutes a system independent of an object of patrol, such as a building. Even in the event that the infrastructural function of the object has been paralyzed by fire or another reason, information can be acquired through use of the robot system.

The robot system according to the present invention may also be utilized as a playmate or a guide robot to be situated in a lobby of a community facility or a hospital. The robot system can execute tasks to be performed by ordinary employees or nurses, such as guide duty and provision of information. In addition, if the robot system is provided with a sewing skin 8 suitable for the motion and expression thereof, an effect of making outpatients or inpatients cheerful can be expected. If the robot sensor is equipped with an image pickup sensor or other sensors, the robot can monitor patients in sickrooms and find and report anomalies. In such a case, so long as the robot system is provided with an appearance milder than an ordinary stationary image pickup device, the robot can perform required monitoring action without making patients feel unpleasant.

Figure 32:
FIG. 32 is a conceptual rendering of a robot system according to an eighth embodiment of the present invention.

FIG. 32 shows an attraction robot to be situated in an amusement park, which is a robot system according to an eighth embodiment of the present invention. The robot system is constructed by covering the robot system according to the second embodiment shown in FIG. 7 with the sewing skin 14 which is suitable for attraction purpose and is charming.

Figure 33:
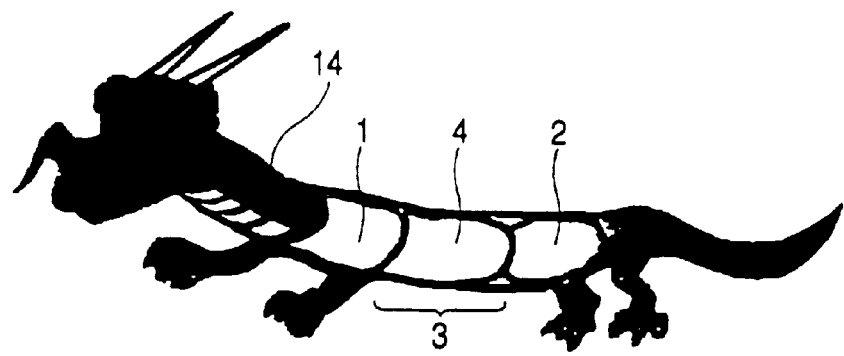
FIG. 33 is a conceptual rendering of a robot system according to a ninth embodiment of the present invention.

The robot system can perform acrobatic action, ensure safety even when having come into contact with a human, is lightweight, and obviates the risk of posing heavy load or damage to a floor of a building. Hence, the robot system can be actuated in various halls, gymnasiums, permanent stages, temporary stages, or pavilions. Further, the robot system can be imparted with an effect of inviting visitors, the function of acting as a playmate for a wait time or in a lobby, and the function of acting as an exhibition instructor. Further, in contrast with a human, the robot system according to the present invention can readily and safely effect three-dimensional and spatial movement. Hence, the robot system can directly move from a terrace to another terrace by means of leaping or flying. Alternatively, the robot system can come close to a specific area of an exhibit which viewers must observe from a distance, through flying or floating, and then clearly indicate the area. In contrast with human's explanations or voice-only explanations, the robot system can provide greater appeal for viewers. For example, FIG. 33 shows a dragon-shaped robot system which has an outer shape imitating a dragon, can crawl over a floor by means of meandering, and move by means of a progressive wave or swimming and flying. Since the robot system ensures a high degree of safety when having come into contact with a human, the robot system is suitable for use in a location where robots are to be actuated in close proximity to persons, such as in a haunted house.

Figure 34A:
FIGS. 34A and 34B are conceptual renderings showing a robot system according to a tenth embodiment of the present invention.
Figure 34B:
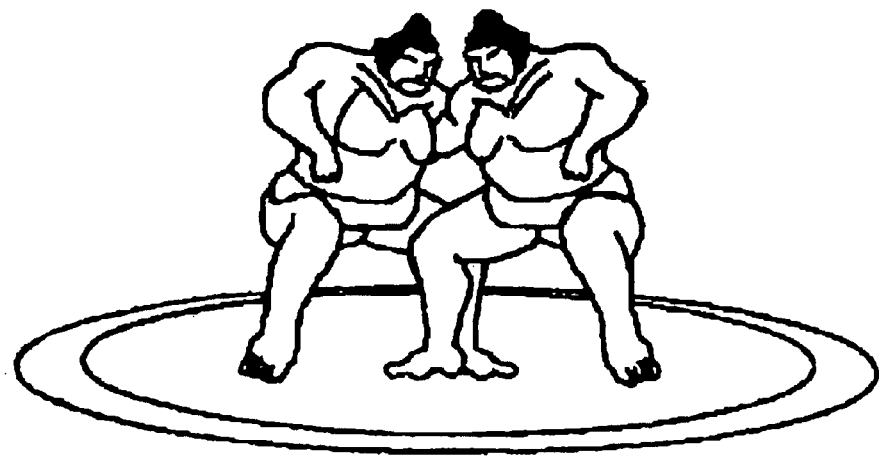

FIGS. 34A and 34B show robot systems for use in a fighting game according to a tenth embodiment of the present invention. The robot systems are formed by means of covering the robot system shown in FIG. 7 with the attractive skin 14 fitting the purpose of the robot. In a room, a permanent amusement park, or a temporary amusement park, the present robot system is actuated autonomously or in accordance with an instruction from an operator. The operator can be entertained by means of causing the robot system to take part a contest or fight as the operator's alter ego. Even in contrast with a video game, a large audience as well as the operator can simultaneously view the action of the robot system from many directions.

FIG. 35 is a view for describing an eleventh embodiment of the present invention, showing that a humanoid robot 200 walks on a ceiling 150 while bottoms 210 of the feet of the robot 200 remain pressed against the ceiling 150 of a house.

As shown in FIGS. 1, 7, and 8, the humanoid robot 200 comprises the bladders 2 for containing the fluid 1 being of lower specific gravity than the outside environment; the segments 3 formed from the bladders 2 or including the bladders 2; link devices 4 which each link a required number of the bladders 2 or the segments 3 in an arbitrary combination so as to constitute a predetermined shape and link system and enable mutual link and movement of the bladders 2 or the segments 3; the drive units 5 for relatively moving the bladders 2 or the segments 3; the sensor system for collecting various external and internal information items; the information processor 8; and the energy supply system 9.

The robot 200 according to the present embodiment is of lower specific gravity than an ambient medium (e.g., air in the case of atmosphere). Hence, the robot 200 floats to an elevated position rather than to a lower surface and remains in contact with the ceiling surface 150 located in an elevated position. When the robot is used in the atmosphere, the specific gravity of the robot 200 is preferably about 0.5 to 1. He gas, H gas, air warmer in temperature and less in specific gravity than the outer air and the like may be used as the fluid 1 filled with in the robot 200.

Figure 36:
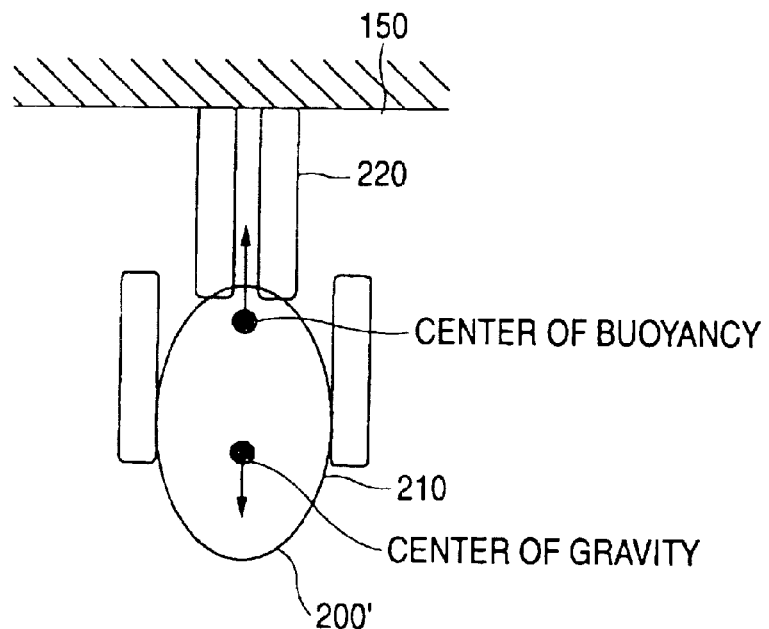
FIG. 36 is an illustration showing the robot system according to the eleventh embodiment when restored to its original state.

FIG. 36 shows the center of gravity of the robot 200 and the center of buoyancy of the same. As shown in FIG. 36, the center of buoyancy is located in a higher position than the center of gravity relative to the vertical direction. The robot 200 remains in a stable state (i.e., a restored state). As mentioned above, while the robot levitates and remains in contact with the upper surface, the robot remains stable while the center of buoyancy is located in a higher position than the center of gravity with reference to the vertical position. By means of making the mass of a head 230 greater than that of legs 220, the robot 200 is adjusted in advance such that the center of gravity comes close to the head 230, and the robot 200 remains in contact with the ceiling 150 via the legs 220.

Figure 37:
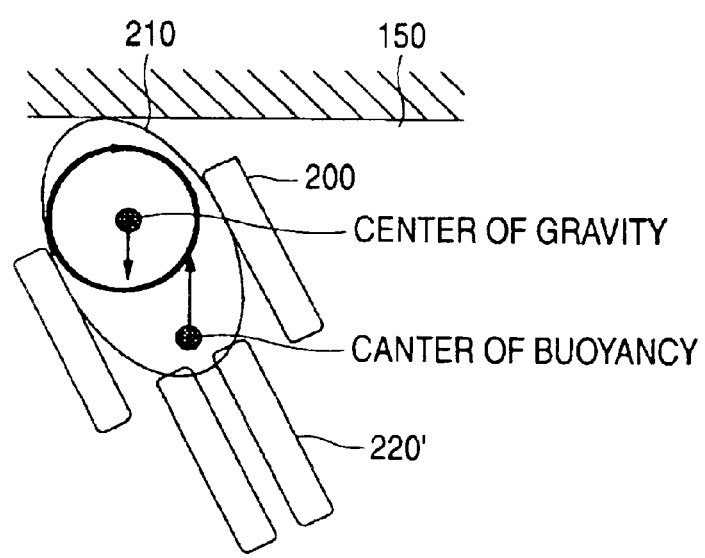
FIG. 37 is an illustration showing the robot system according to the eleventh embodiment when in an unrestored state.

FIG. 37 shows that the robot 200 has gotten out of the restored state shown in FIG. 36. As shown in the drawing, the robot 200 remains in contact with the ceiling 150 at a certain point on the head 230. In this state, the center of gravity of the robot 200 gets out of line with the center of buoyancy. Hence, the robot 200 undergoes the coupling of two forces; that is, gravitational force and buoyant force. The coupled forces play a role of restoration force which attempts to return the robot 200 to its intended state. Finally, the robot 200 returns to a restored state shown in FIG. 36. Accordingly, the robot 200 is always held in a state in which the bottoms 210 of the feet remain in contact with the ceiling 150.

Since the gravitational force acting on the robot 200 is smaller than the buoyant force, the robot 200 remains pressed against the ceiling 150 under the buoyant force. Accordingly, the robot 200 undergoes vertical reaction from the ceiling 150, friction develops between the ceiling 150 and the bottoms 210 of the feet of the robot 200. By means of friction, the robot 200 is fixed at a position on the ceiling 150. Further, the robot 200 can walk on the ceiling 150 by means of actuating the legs 220 by means of utilization of the friction between the ceiling 150 and the bottoms of the feet 210.

As shown in the eleventh embodiment, the robot system according to the present invention can be levitated into the air and brought into contact with the ceiling 150 by means of making the specific gravity of the robot 200 lower than that of an ambient medium. So long as the positional relationship between the center of buoyancy and the center of gravity is set such that the legs are located in a position above the head 230, the robot can step firmly on the ceiling 150 by way of the legs.

Figure 38:
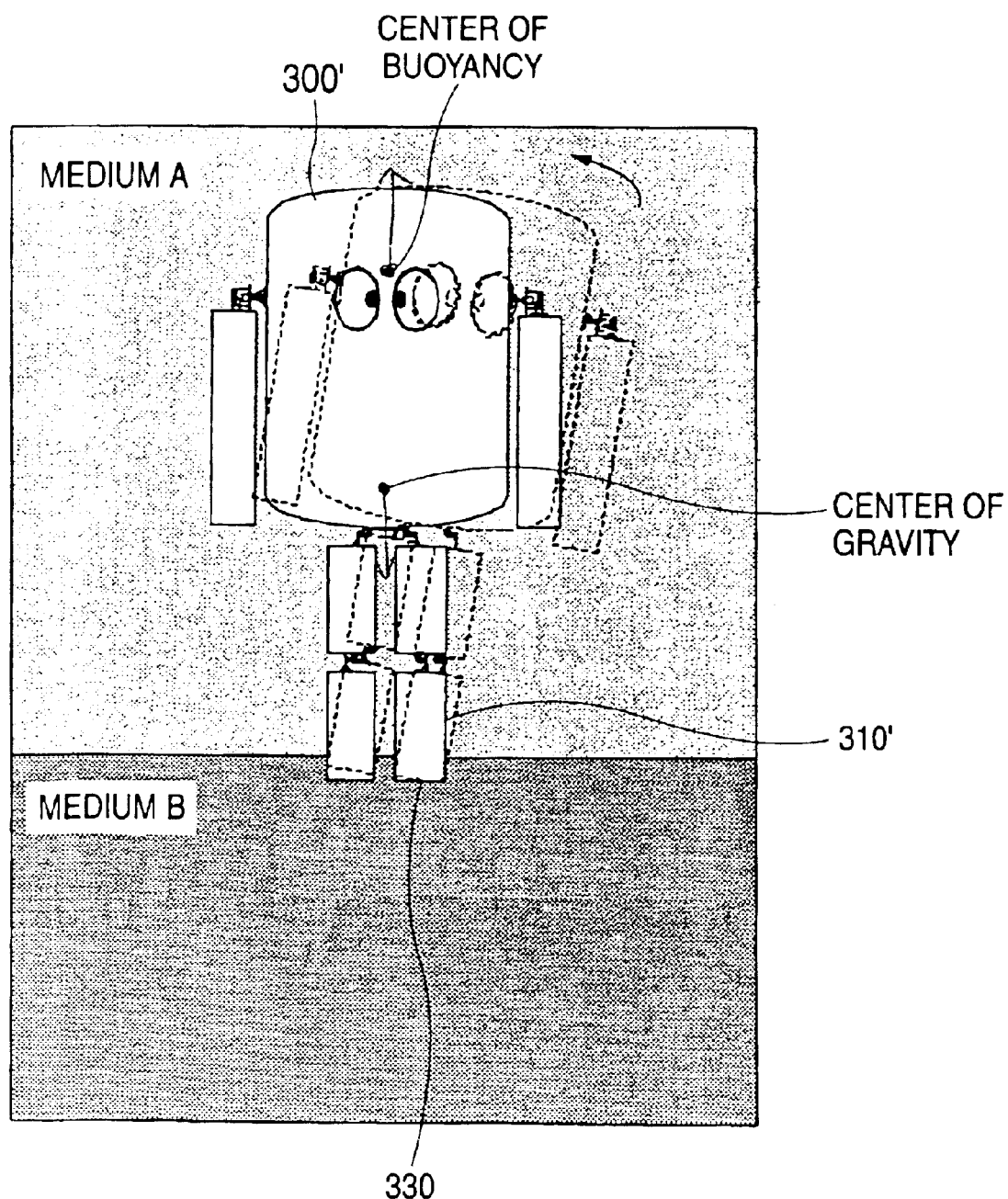
FIG. 38 shows a robot according to a twelfth embodiment of the present invention when remaining in an upright position in a boundary surface between a medium A and a medium B.

FIG. 38 is an illustration showing a twelfth embodiment of the present invention. A humanoid robot 300 stands upright along a boundary surface between a medium A and a medium B while portions of legs 310 have gotten into the medium B from the medium A. FIG. 39 shows that the humanoid robot 300 walks on the boundary surface.

As shown in FIGS. 1, 7, and 8, the humanoid robot 300 comprises the bladders 2 which contain the fluid 1 being of lower specific gravity than the outside environment; the segments 3 formed from the bladders 2 or including the bladders 2; the link devices 4 which each can link a required number of the bladders 2 or the segments 3 in an arbitrary combination so as to constitute a predetermined shape and link system and enable mutual link and movement of the bladders 2 or the segments 3; the drive units 5 for relatively moving the bladders 2 or the segments 3; the sensor system for collecting various external and internal information items; the information processor 8; and the energy supply system 9.

There will now be described a principle in which the humanoid robot 300 stably stands upright and walks when air is taken as the medium A and water is taken as the medium B.

The humanoid robot 300 is preferably about 1 to 2. He gas, H gas, air warmer in temperature and less in specific gravity than the outer air and the like may be used as the fluid 1 filled with in the robot 200.

Such a humanoid robot 300 is placed on water on the earth, a part of the humanoid robot 300 goes underwater under its own weight, and the amount of water corresponding to the volume of the part that has gone under water is displaced. As a result, the humanoid robot 300 is susceptible to buoyant force from the medium B. In a state in which there is obtained a balance between the buoyant force and gravitational force, sinking of the legs into water is stopped. This phenomenon is identical with the principle (i.e., Archimedes' principle) by which a ship floats on water.

The robot 300 discharges the amount of air corresponding to the volume of the part of the robot 300 located above water and receives buoyant force. In a restored state (i.e., the portion of the robot 300 indicated by the solid lines in FIG. 38), the center of buoyant force (center of buoyancy) received from air is located in a position elevated from the center of gravity with reference to the vertical direction.

As indicated by wavy lines in FIG. 38, when the robot 300 has gotten out of the restored state, the center of buoyancy is out of alignment with the center of gravity with reference to the vertical direction. Eventually, the coupling of forces arises. The coupled forces act as restoration force, as in the case of the eleventh embodiment. The coupled forces act on the robot 300 such that the robot 300 attempts to return its restored state indicated by solid lines shown in FIG. 38. Further, the coupled forces developing between the buoyant force stemming from discharge of water and gravitational force also contribute to restoration force and act on the robot 300 so as to restore the robot 300 to its restored state.

The robot 300 stands on the water surface by utilizing counteraction due to viscosity and wave resistance of water. Moreover, the robot 300 can move on the water surface 350 as if the robot 300 walks thereon by utilizing counteraction due to viscosity and wave resistance of water provided when the leg portion 310 is actuated.

As shown in the twelfth embodiment, the robot system according to the present invention can be arranged on the boundary surface between air and water by means of striking a balance between buoyant force and gravitational force. In addition, the robot can walk on water by utilizing counteraction due to viscosity and wave resistance of water provided when the leg portion is actuated.

In the twelfth embodiment, water and air are used as two example mediums. In general, any mediums may be employed, so long as they differ from each other. For example, if a robot according to the present invention is applied to a pot having water and oil sealed therein, there can be realized a robot which walks on a boundary surface between water and oil.

As has been described, according to the present invention, there is no necessity for a complex attitude control system or heavy ballast. By means of restoration force developing from buoyant force produced by the bladders filled with a fluid being of lower specific gravity than the outside environment, the robot system is held in a stable posture regardless of whether the robot system is stationary or operating.

What is claimed is:

1. A robot system comprising:
   at least two segments;
   joints for interconnecting the at least two segments;
   drive units for actuating the at least two segments;
   a controller for controlling the drive units; and
   a bladder which is provided in at least one of the at least two segments, the joints, the drive units, and the controller and which is filled with a fluid, the fluid being of lower specific gravity than the outside environment.

2. The robot system according to claim 1, wherein a center of buoyancy differs from a center of gravity.

3. The robot system according to claim 1, wherein the robot system has a specific gravity of 1 or more relative to the outside environment.

4. The robot system according to claim 1, wherein the product of gravitational force and a distance between a ground point where the system comes into contact with the ground and the center of gravity is smaller than the product of buoyant force and a distance between the ground point and the center of buoyancy.

5. The robot system according to claim 1, wherein the bladder is formed in the segments.

6. The robot system according to claim 1, further comprising a regulator for regulating the amount of fluid filled in the bladder.

7. The robot system according to claim 1, further comprising a valve for filling the bladder with a fluid or releasing the fluid from the bladder.

8. The robot system according to claim 7, wherein the valve is a check valve for preventing outflow of the fluid from the inside of the bladder to the outside.

9. The robot system according to claim 1, wherein one of the segments constitutes a leg section, and buoyant force is greater than gravitational force so that the leg section can contact a ceiling.

10. The robot system according to claim 1, wherein one of the segments constitutes a leg section, and the leg section comes into contact with a water surface.

11. The robot system according to claim 1, wherein the bladder is formed from a flexible material.

12. The robot system according to claim 1, wherein the fluid pressure exerted on the inside of the bladder is variable.

13. The robot system according to claim 1, further comprising a transceiver for transmitting information to the outside and receiving information from the outside, and the robot system is constructed so as to enable remote control of the drive units.

14. The robot system according to claim 1, further comprising a power supply unit for supplying energy for driving the drive units.

15. The robot system according to claim 1, further comprising sensors for acquiring information about the inside and outside of the robot system.

16. A robot system comprising:
   at least two bladders filled with a fluid being of lower specific gravity than the outside environment.

17. The robot system according to claim 16, further comprising:
   a joint which links the bladders together;
   a drive unit for driving the joint; and
   a controller for controlling the drive unit.

18. The robot system according to claim 16, wherein a center of buoyancy differs from a center of gravity.

19. The robot system according to claim 16, wherein the robot system has a specific gravity of 1 or more relative to the outside environment.

20. The robot system according to claim 16, wherein the bladder is formed in the segments.

21. The robot system according to claim 16, further comprising a regulator for regulating the amount of fluid filled in the bladder.

22. The robot system according to claim 21, wherein the valve is a check valve for preventing outflow of the fluid from the inside of the bladder to the outside.

23. The robot system according to claim 16, further comprising a valve for filling the bladder with a fluid or releasing the fluid from the bladder.

24. The robot system according to claim 16, wherein the bladder is formed from a flexible material.

25. The robot system according to claim 16, wherein the fluid pressure exerted on the inside of the bladder is variable.

26. The robot system according to claim 17, further comprising a power supply unit for supplying energy for driving the drive units.

* * * * *